US009698875B2

(12) United States Patent
Asakura

(10) Patent No.: US 9,698,875 B2
(45) Date of Patent: *Jul. 4, 2017

(54) COMMUNICATION DEVICE

(71) Applicant: Brother Kogyo Kabushiki Kaisha, Nagoya-shi, Aichi-ken (JP)

(72) Inventor: Hirotaka Asakura, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/132,432

(22) Filed: Apr. 19, 2016

(65) Prior Publication Data

US 2016/0233926 A1  Aug. 11, 2016

Related U.S. Application Data

(63) Continuation of application No. 13/957,479, filed on Aug. 2, 2013, now Pat. No. 9,596,007.

(30) Foreign Application Priority Data

Aug. 3, 2012 (JP) ................................. 2012-173269

(51) Int. Cl.
*H04B 5/00* (2006.01)
*H04W 4/00* (2009.01)
(Continued)

(52) U.S. Cl.
CPC ......... *H04B 5/0056* (2013.01); *H04B 5/0031* (2013.01); *H04W 4/008* (2013.01);
(Continued)

(58) Field of Classification Search
CPC ........................... H04B 5/0056; H04B 13/005
See application file for complete search history.

(56) References Cited

U.S. PATENT DOCUMENTS 7,209,706 B2   4/2007 Fujii et al.
7,346,061 B2   3/2008 Takayama et al.
(Continued)

FOREIGN PATENT DOCUMENTS

CN   101253469 A   8/2008
CN   101790183 A   7/2010
(Continued)

OTHER PUBLICATIONS

NFCForum-TS-SNEP_1.0 Aug. 31, 2011.*
(Continued)

*Primary Examiner* — Cindy Trandai
(74) *Attorney, Agent, or Firm* — Banner & Witcoff, Ltd.

(57) ABSTRACT

A communication device may establish at least one type of connection among a first type of connection and a second type of connection which are according to a particular protocol defined in an NFC standard based on a current state of the communication device and a current state of an external device. The first type of connection may be a connection in which the communication device operates as a server and the external device operates as a client. The second type of connection may be a connection in which the communication device operates as a client and the external device operates as a server. The communication device may communicate the target data with the external device by using the established connection. The contents of the communication may be different in response to which type of connection is established.

12 Claims, 9 Drawing Sheets

(51) Int. Cl.
*H04W 76/02* (2009.01)
*H04W 80/08* (2009.01)

(52) U.S. Cl.
CPC ......... *H04W 76/023* (2013.01); *H04W 80/08* (2013.01); *H04W 76/025* (2013.01)

(56) References Cited

U.S. PATENT DOCUMENTS

| | | |
|---|---|---|
| 2003/0007606 A1 | 1/2003 | Suder et al. |
| 2004/0116074 A1 | 6/2004 | Fujii et al. |
| 2004/0192264 A1 | 9/2004 | Liu et al. |
| 2005/0077356 A1* | 4/2005 | Takayama .......... G06K 7/10237 235/451 |
| 2005/0088709 A1 | 4/2005 | Kizaki et al. |
| 2006/0101280 A1 | 5/2006 | Sakai |
| 2006/0126118 A1 | 6/2006 | Nagata |
| 2007/0190937 A1* | 8/2007 | Takayama ............ H04B 5/0031 455/41.1 |
| 2007/0190939 A1 | 8/2007 | Abel |
| 2007/0230332 A1 | 10/2007 | Fukasawa |
| 2008/0052710 A1 | 2/2008 | Iwai et al. |
| 2008/0084578 A1 | 4/2008 | Walker et al. |
| 2008/0117847 A1 | 5/2008 | Hamada |
| 2008/0218810 A1 | 9/2008 | Itoh |
| 2008/0222711 A1 | 9/2008 | Michaelis |
| 2008/0231900 A1 | 9/2008 | Abe |
| 2008/0232405 A1 | 9/2008 | Gallo |
| 2009/0023476 A1 | 1/2009 | Saarisalo et al. |
| 2009/0033972 A1* | 2/2009 | Kato .................. H04N 1/00347 358/1.13 |
| 2009/0036056 A1 | 2/2009 | Oshima et al. |
| 2009/0052348 A1* | 2/2009 | Kato .................. H04L 63/0492 370/254 |
| 2009/0066998 A1 | 3/2009 | Kato |
| 2009/0073482 A1 | 3/2009 | Tsuchiya |
| 2009/0103124 A1 | 4/2009 | Kimura et al. |
| 2009/0147803 A1* | 6/2009 | Takayama ............ G06K 7/0008 370/475 |
| 2009/0193500 A1 | 7/2009 | Griffin et al. |
| 2009/0271519 A1 | 10/2009 | Helvick |
| 2010/0050189 A1 | 2/2010 | Sng |
| 2010/0058359 A1 | 3/2010 | Ferlitsch |
| 2010/0078471 A1 | 4/2010 | Lin et al. |
| 2010/0078472 A1 | 4/2010 | Lin et al. |
| 2010/0082485 A1 | 4/2010 | Lin et al. |
| 2010/0130127 A1* | 5/2010 | Takayama ................ H04B 5/02 455/41.1 |
| 2010/0151790 A1 | 6/2010 | Hoeksel et al. |
| 2010/0188695 A1 | 7/2010 | Okigami |
| 2010/0207735 A1 | 8/2010 | Kim |
| 2010/0207742 A1 | 8/2010 | Buhot et al. |
| 2010/0241857 A1* | 9/2010 | Okude .................... B60R 25/24 713/168 |
| 2011/0002005 A1 | 1/2011 | Ashmore |
| 2011/0028091 A1 | 2/2011 | Higgins et al. |
| 2011/0065385 A1 | 3/2011 | Geslin et al. |
| 2011/0090830 A1 | 4/2011 | Churei |
| 2011/0177780 A1 | 7/2011 | Sato et al. |
| 2011/0258322 A1 | 10/2011 | Luzzatti et al. |
| 2011/0292445 A1* | 12/2011 | Kato ..................... G06F 3/1222 358/1.15 |
| 2012/0034868 A1 | 2/2012 | Fine et al. |
| 2012/0069772 A1 | 3/2012 | Byrne et al. |
| 2012/0100803 A1 | 4/2012 | Suumaki et al. |
| 2012/0101944 A1 | 4/2012 | Lin et al. |
| 2012/0166338 A1 | 6/2012 | Agnelli et al. |
| 2012/0297048 A1 | 11/2012 | Hsu |
| 2012/0329390 A1 | 12/2012 | Kim |
| 2013/0009752 A1 | 1/2013 | Finkenzeller et al. |
| 2013/0077124 A1 | 3/2013 | Vojak |
| 2013/0080276 A1 | 3/2013 | Granbery |
| 2013/0165042 A1 | 6/2013 | Gillespie et al. |
| 2013/0166969 A1* | 6/2013 | Zhang ................ G06F 11/0772 714/57 |
| 2013/0196595 A1 | 8/2013 | Byrne et al. |
| 2013/0204726 A1 | 8/2013 | Cruttenden et al. |
| 2013/0215467 A1* | 8/2013 | Fein ...................... G06F 3/1204 358/1.15 |
| 2013/0229684 A1 | 9/2013 | Yasuzaki |
| 2013/0229690 A1 | 9/2013 | Sumita et al. |
| 2013/0258390 A1 | 10/2013 | Suzuki et al. |
| 2013/0260683 A1 | 10/2013 | Suzuki et al. |
| 2013/0260684 A1 | 10/2013 | Suzuki et al. |
| 2013/0311313 A1 | 11/2013 | Laracey |
| 2014/0038517 A1 | 2/2014 | Asakura |
| 2014/0038518 A1 | 2/2014 | Asakura |
| 2014/0038519 A1 | 2/2014 | Asakura |
| 2014/0047038 A1 | 2/2014 | Piratla et al. |
| 2014/0063537 A1 | 3/2014 | Nishikawa et al. |
| 2014/0068719 A1* | 3/2014 | Kiukkonen ........... H04W 12/08 726/4 |
| 2014/0104635 A1 | 4/2014 | Nishikawa |
| 2014/0219453 A1 | 8/2014 | Neafsey et al. |
| 2014/0256251 A1 | 9/2014 | Caceres et al. |
| 2014/0293980 A1 | 10/2014 | Shibata |
| 2014/0304596 A1 | 10/2014 | Chandran et al. |
| 2014/0368859 A1* | 12/2014 | Gutnik .................. G06F 3/1206 358/1.14 |
| 2015/0093992 A1 | 4/2015 | Tanaka |
| 2015/0126115 A1 | 5/2015 | Yun et al. |
| 2015/0205550 A1 | 7/2015 | Lee et al. |
| 2015/0208245 A1 | 7/2015 | Robinton et al. |
| 2015/0213436 A1 | 7/2015 | Griffin et al. |
| 2015/0220290 A1 | 8/2015 | Park et al. |
| 2015/0270912 A1 | 9/2015 | Dhayni et al. |
| 2015/0317116 A1 | 11/2015 | Suzuki et al. |
| 2015/0327172 A1 | 11/2015 | Kusakabe |
| 2015/0350905 A1 | 12/2015 | Suzuki |

FOREIGN PATENT DOCUMENTS

| | | |
|---|---|---|
| EP | 2296292 A1 | 3/2011 |
| EP | 2645265 A2 | 10/2013 |
| JP | H11-154061 A | 6/1999 |
| JP | 2000-228666 A | 8/2000 |
| JP | 2004-200840 A | 7/2004 |
| JP | 2009-037566 A | 2/2009 |
| JP | 2009-135865 A | 6/2009 |
| JP | 2011-044092 A | 3/2011 |
| JP | 2011-146991 A | 7/2011 |
| JP | 2013187565 A | 9/2013 |
| JP | 2013-214139 A | 10/2013 |
| JP | 2013-214804 A | 10/2013 |
| WO | 2005/017738 A1 | 2/2005 |

OTHER PUBLICATIONS

61601496,Specification,Feb. 21, 2012.*
61601496,Drawings-other_ . . . drawings,Feb. 21, 2012.*
Anonymous,:"Near Field Communication White Paper", Feb. 12, 2004, URL:http://www.ecma-international.org/activities/Communications/2004tg19-001.pdf [retrieved on Mar. 6, 2006].
Wi-Fi Peer-to-Peer (P2P) Technical Specification Version 1.1 2010, pp. 1-159.
Jan. 17, 2014—(EP) Search Report—Application No. 13179289.7.
Smart Cards; UICC-CLF interface; Host Controller Interface P2P LNC Protocol, Vo. 1.0, Jan. 11, 2008, pp. 1-33.
May 9, 2014—(US) Non-Final Office Action—U.S. Appl. No. 13/834,423.
May 9, 2014—(US) Non-Final Office Action—U.S. Appl. No. 13/833,236.
Jul. 23, 2013—(EP) Extended Search Report—Application No. 13161732.6.
Sep. 4, 2014—(US) Final Office Action—U.S. Appl. No. 13/834,423.
Oct. 27, 2014—(EP) Office Action—App 13159607.4.
Oct. 20, 2014—(US) Notice of Allowance—U.S. Appl. No. 13/833,236.
Dec. 12, 2014—(US) Notice of Allowance—U.S. Appl. No. 13/834,423.

(56) References Cited

OTHER PUBLICATIONS

Information Technology—Telecommunications and information exchange between systems—Near Field Communication Interface and Protocol-2 (NFCIP-2), ISO/IEC 21481, Second edition, Jul. 1, 2012.
Information Technology—Telecommunications and information exchange between systems—Near Field Communication—Interface and Protocol (NFCIP-1), ISO/IEC 18092, Second edition, Mar. 15, 2013.
Filed Mar. 13, 2014—Co-pending U.S. Appl. No. 14/208,220.
Nosowitz, D., "Everything You Need to Know about Near Field Communication," Popular Science, posted Mar. 1, 2011.
Mar. 31, 2015—(US) Notice of Allowance—U.S. Appl. No. 13/834,423.
Mar. 6, 2015—(CN) Notification of First Office Action—App 201310097370.7.
Apr. 15, 2015—(US) Non-Final Office Action—U.S. Appl. No. 13/959,786.
Filed Sep. 9, 2014 Co-pending U.S. Appl. No. 14/498,213 as filed.
Requirement for Election issued in U.S. Appl. No. 13/834,423, mailed Feb. 24, 2014.
Co-pending U.S. Appl. No. 13/833,236, filed Mar. 15, 2013.
Filed Mar. 26, 2015—Co-pending U.S. Appl. No. 14/669,553.
Sep. 30, 2015—(US) Notice of Allowance—U.S. Appl. No. 14/208,220.
Oct. 2, 2015—(US)—Final Office Action—U.S. Appl. No. 13/959,786.
Aug. 31, 2011—NFC Forum, Simple NDEF Exchange Protocol Technical Specification, NFC Forum, SNEP 1.0, NFCForum-TS-SNEP_1.0.
Oct. 8, 2015—(EP) Extended European Search Report—App 15169695.2.
Dec. 22, 2015—(JP) Notification of Reasons for Rejection—App 2012-082818—Eng Tran.
Dec. 22, 2015—(CN) Notification of First Office action—App 201310339554.X—Eng Tran.
Feb. 17, 2016—(US)—Final Office Action—U.S. Appl. No. 14/706,368.
Jan. 25, 2016—(US) Non-Final Office Action—U.S. Appl. No. 13/957,490.
Apr. 26, 2016—(US) Non-Final Office Action—U.S. Appl. No. 13/959,786.
May 6, 2016—(US) Non-Final Office Action—U.S. Appl. No. 13/957,479.
May 11, 2016—(US) Notice of Allowance—U.S. Appl. No. 14/706,368.
May 6, 2016 (US) Non-Final Office Action—U.S. Appl. No. 14/208,220.
Mar. 1, 2016—(JP) Notice of Reasons for Rejection—App 2012-193091—Eng Tran.
Filed Jul. 2, 2013—Co-pending U.S. Appl. No. 13/933,419.
Jan. 12, 2016—(JP) Notification of Reasons for Rejection—App 2012-082819—Eng Tran.
Feb. 25, 2016—(US) Final Office Action—U.S. Appl. No. 13/834,434.
Jan. 29, 2016—(US) Notice of Allowance—U.S. Appl. No. 14/663,923.
Jan. 12, 2016—(JP) Notification of Reasons for Rejection—App 2012-082819.
Jun. 20, 2016—(US) Final Office Action—U.S. Appl. No. 13/957,490.
May 17, 2016—(JP) Notification of Reasons for Rejection—App 2012-082818—Eng Trans.
May 3, 2016—(CN) Office Action—App 201310084346.X—Eng Tran.
Jan. 17, 2014—(EP) Extended Search Report—App 13179157.6.
Aug. 31, 2011—"Simple NDEF Exchange Protocol"—Technical Specification, SNEP 1.0, pp. 1-20.
Jan. 17, 2014—(EP) Extended Search Report—App 13179154.3.
Feb. 12, 2015—(US) Non-Final Office Action—U.S. Appl. No. 13/957,490.
Oct. 14, 2015—(EP) Office Action—App 13179157.6.
Jul. 4, 2012—Jara, Antonio et al., "Interaction of patients with breathing problems through NFC in Ambient Assisted Living environements," 2012 Sixth International Conference on Innovative Mobile and Internet Services in Ubiquitous Computing, pp. 892-897, XP032234827, DOI: 10.1109/IMIS.2012.150 ISBN: 978-1-4673-1328-5.
May 14, 2012—Monteiro, David et al., "A Secure NFC Application for Credit Transfer Among Mobile Phones," 2012 International Conference on Computer Information and Telecommunication Systems (CITS), IEEE, pp. 1-5, XP032188431, DOI: 10.1109/CITS. 2012.6220369 ISBN: 978-1-4673-1549-4.
Mar. 8, 2016—(JP) Notification of Reasons for Rejection—App 2012-173269.
Feb. 7, 2017—(JP) Notification of Reasons for Rejection—App 2013-204535—Eng Trans.
Nov. 18, 2016—(US) Notice of Allowance—U.S. Appl. No. 14/208,220.
Dec. 6, 2016—(US) Notice of Allowance—U.S. Appl. No. 14/706,368.
Dec. 2, 2016—(US) Notice of Allowance—U.S. Appl. No. 13/957,479.
Dec. 22, 2016—(US) Notice of Allowance—U.S. Appl. No. 13/957,490.
Jan. 10, 2017—(US) Notice of Allowance—U.S. Appl. No. 13/834,434.
Nov. 25, 2016—(CN) Office Action—App 201310084346.X—Eng Tran.
Jun. 22, 2016—(US) Notice of Allowance—U.S. Appl. No. 14/706,368.
Aug. 9, 2016—(US) Notice of Allowance—U.S. Appl. No. 13/957,479.
Aug. 11, 2016—(US) Notice of Allowance—U.S. Appl. No. 13/959,786.
Aug. 23, 2016—(US) Non-Final Office Action—U.S. Appl. No. 14/498,213.
Jul. 7, 2010—NFC FORUM Connection Handover Technical Specification 1.2.
Aug. 24, 2016—(US) Notice of Allowance—U.S. Appl. No. 14/208,220.
Aug. 25, 2016—(US) Non-Final Office Action—U.S. Appl. No. 13/834,434.
Nov. 3, 2016—(US) Non-Final Office Action—U.S. Appl. No. 15/162,995.
Nov. 2, 2016—(US) Non-Final Office Action—U.S. Appl. No. 14/669,553.
Mar. 1, 2017—(US) Notice of Allowance—U.S. Appl. No. 15/162,995.

\* cited by examiner (First Embodiment)

FIG. 3
(First Embodiment; Case A1)
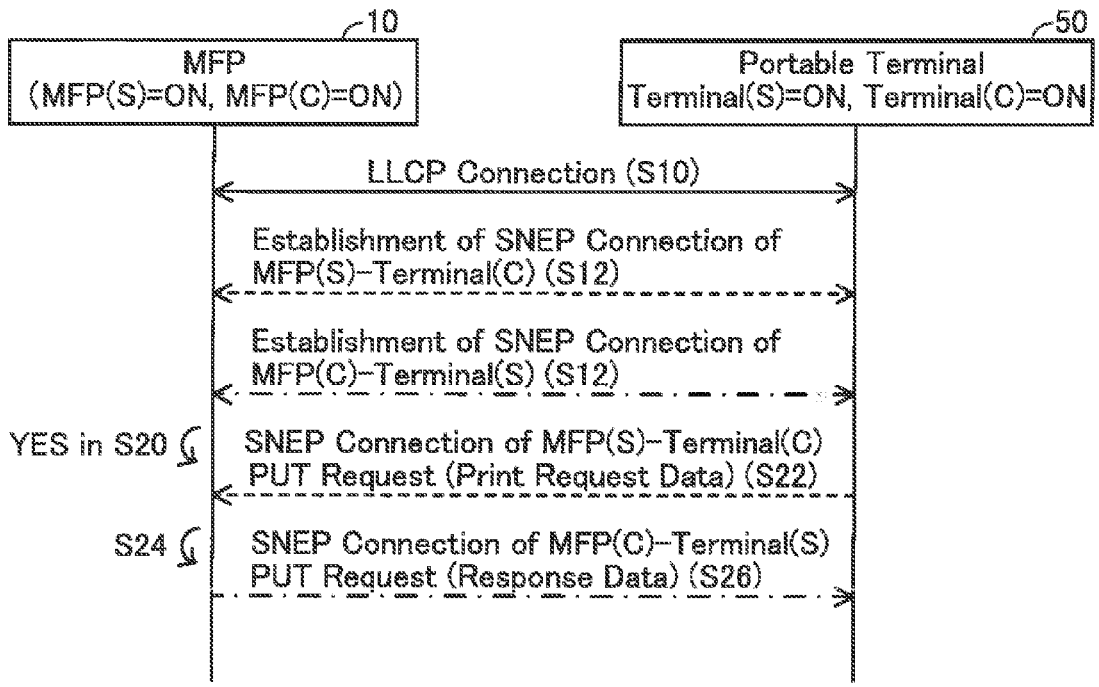
(Modified Embodiment)
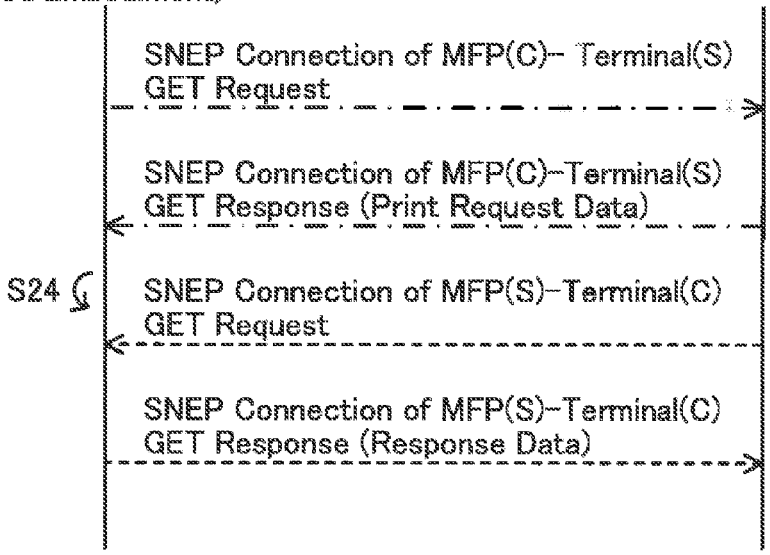

(Second Embodiment; Case B2)

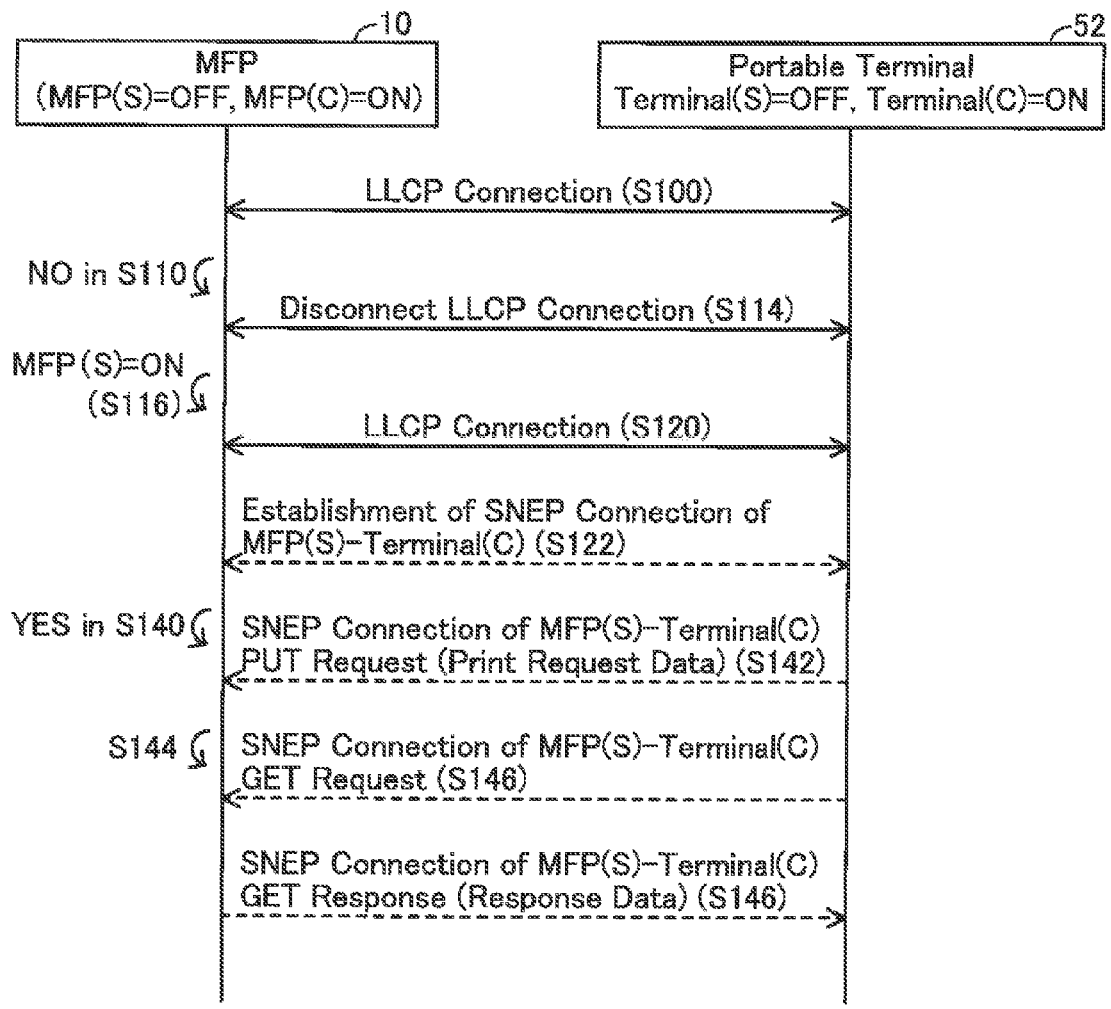

COMMUNICATION DEVICE

CROSS-REFERENCE TO RELATED APPLICATION(S)

This application is a continuation of U.S. patent application Ser. No. 13/957,479 filed Aug. 2, 2013, which claims priority to Japanese Patent Application No. 2012-173269, filed on Aug. 3, 2012, the contents of which are hereby incorporated by reference into the present application.

TECHNICAL FIELD

The technology disclosed in the present specification relates to a communication device that performs a communication of target data with an external device according to an NFC (an abbreviation of Near Field Communication) scheme complying with an NFC standard.

DESCRIPTION OF RELATED ART

A system with a communication terminal and an NFC device is known. In a state where the communication terminal is in an R/W mode and the NFC device in the passive tag mode, the communication terminal sends a request for reading data to the NFC device. Subsequently, the communication terminal and the NFC device enter a P2P mode. In a state where the communication terminal is in the P2P mode and the NFC device in the P2P mode, the NFC device transfers data to the communication terminal. Upon completion of this data transfer, the communication terminal enters the passive tag mode, while the NFC device enters the R/W mode.

SUMMARY

The present specification provides technology for allowing a communication device to appropriately communicate target data with an external device according to an NFC scheme.

One aspect of the technique disclosed in the present specification may be a communication device configured to communicate target data with an external device according to an NFC (Near Field Communication) scheme complying with an NFC standard. The communication device may comprise: an NFC interface configured to operate in the NFC scheme; a processor; and a memory configured to store computer executable instructions. The computer executable instructions, when executed by the processor, may cause the communication device the processor to execute: establishing, between the communication device and the external device, based on a current state of the communication device and a current state of the external device, at least one type of connection among a first type of connection and a second type of connection which are according to a particular protocol defined in the NFC standard, wherein the establishing includes: establishing the first type of connection in a case where the current state of the communication device is a state in which a server function according to the particular protocol is being valid and the current state of the external device is a state in which a client function according to the particular protocol is being valid, the first type of connection being a connection in which the communication device operates as a server and the external device operates as a client; and establishing the second type of connection in a case where the current state of the communication device is a state in which the client function is being valid and the current state of the external device is a state in which the server function is being valid, the second type of connection being a connection in which the communication device operates as a client and the external device operates as a server; and communicating the target data with the external device via the NFC interface by using the established at least one type of connection, the contents of the communicating being different in response to which type of connection among the first type of connection and the second type of connection is established.

Note that a controlling method, computer executable instructions, and a non-transitory computer readable medium for storing the computer executable instructions which are for realizing the communication device described above are newly useful. A communication system including the communication device and the external device is also newly useful.

BRIEF DESCRIPTION OF DRAWINGS

FIG. 3 shows a sequence chart of communication in a case A1.

FIG. 9 shows a sequence chart of communication in a case B3.

EMBODIMENT

First Embodiment (Configuration of Communication System 2)

Figure 1:
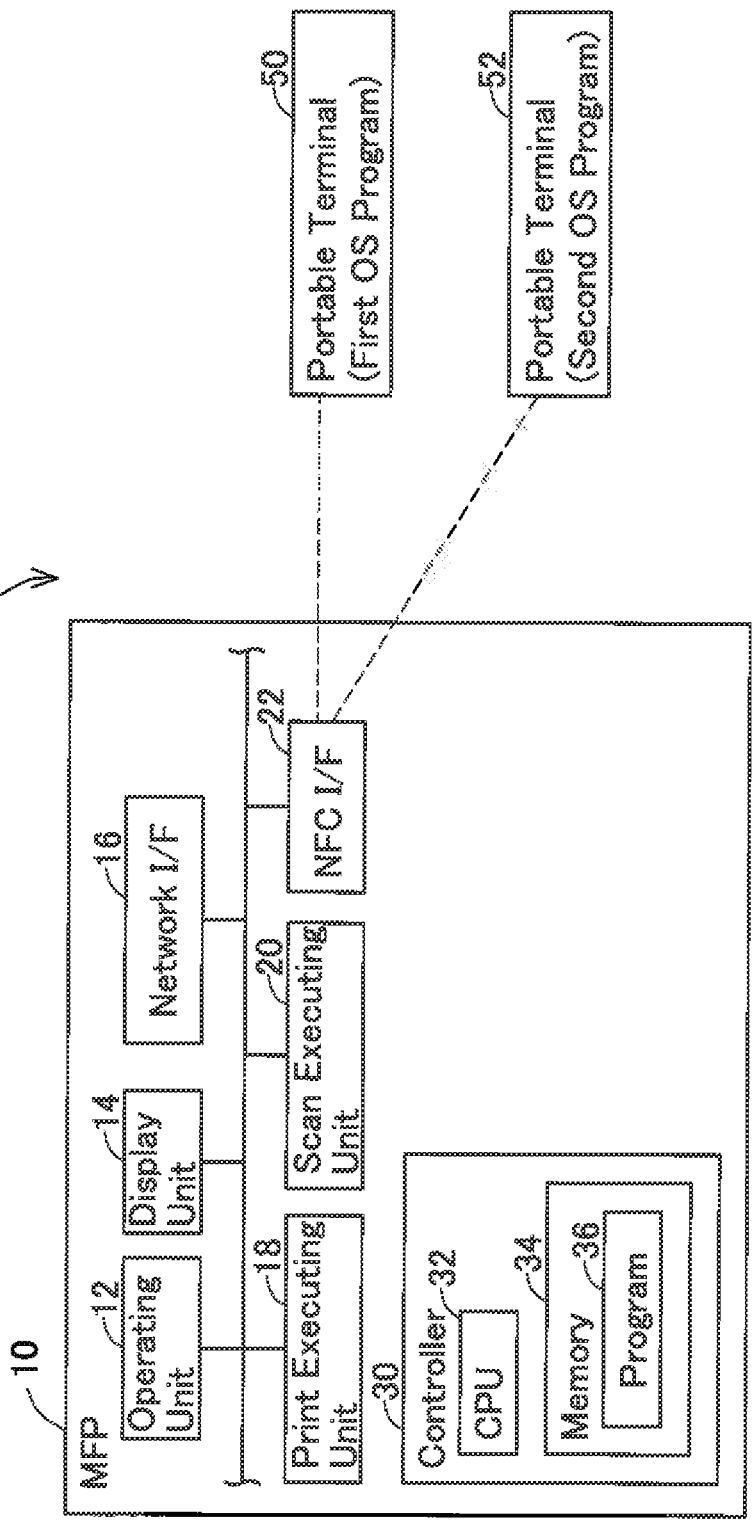
FIG. 1 shows a configuration of a communication system.

As shown in FIG. 1, a communication system 2 has a multi-function peripheral ("MFP" hereinafter) 10, and portable terminals 50, 52. The MFP 10 and the portable terminals 50, 52 are capable of executing communication under a communication scheme complying with the NFC standard (i.e. NFC scheme). In this embodiment, the NFC standard is an international standard defined in ISO/IEC 21481 or ISO/IEC 18092. Communication under the NFC scheme means wireless communication using a radio wave of 13.56 MHz band. The MFP 10 and the portable terminals 50, 52 are capable of executing wire communication or wireless communication by means of a communication network different from an NFC scheme communication link.

(Configuration of MFP 10)

The MFP 10 has an operating unit 12, a display unit 14, a network interface (described as "I/F" hereinafter) 16, a print executing unit 18, a scan executing unit 20, an NFC I/F 22, and a controller 30.

The operating unit 12 has a plurality of keys. A user can input various instructions to the MFP 10 by operating the operating unit 12. The display unit 14 is for displaying various types of information. The network I/F 16 may be an I/F for a wired network connection or an I/F for a wireless network connection. Note that this wireless network is a network for allowing the execution of wireless communication different from the NFC scheme communication, and is a network complying with, for example, IEEE (The Institute of Electrical and Electronics Engineers, Inc.) 802.11 standard and its equivalent (e.g., 802.11a, 11b, 11g, 11n, etc.). The print executing unit 18 is an inkjet or laser printing mechanism. The scan executing unit 20 is a scanning mechanism such as a CCD or CIS.

The NFC I/F 22 is an interface for executing the NFC scheme communication. The NFC I/F 22 is configured by a chip different from the network I/F 16. The network I/F 16 and the NFC I/F 22 differ from each other in terms of the following points in a case where the network I/F 16 is an I/F for connecting with a wireless network.

In other words, the speed of wireless communication using the network I/F 16 is higher than the speed of wireless communication using the NFC I/F 22. The frequency of a carrier wave in the wireless communication performed using the network I/F 16 is different from the frequency of a carrier wave in the wireless communication performed using the NFC I/F 22. When the distance between the MFP 10 and the portable device 50 is approximately 10 cm or less, the MFP 10 can execute the NFC scheme communication with the portable device 50 using the NFC I/F 22. On the other hand, even when the distance between the MFP 10 and the portable device 50 is equal to or greater than 10 cm, or equal to or less than 10 cm, the MFP 10 can execute the wireless communication with the portable device 50 using the network I/F 16. In other words, the maximum distance in which the MFP 10 can execute the wireless communication with a communication-destination device (e.g., the portable device 50) via the network I/F 16 is greater than the maximum distance in which the MFP 10 can execute the wireless communication with the communication-destination device via the NFC I/F 22. It should be noted that the wireless communication using the network I/F 16 is referred to as "network wireless communication" hereinafter.

The controller 30 has a CPU 32 and a memory 34. The CPU 32 executes various processes in accordance with program 36 stored in the memory 34. The memory 34 is configured by a ROM, a RAM, a hard disk, and the like. The memory 34 stores therein the program 36 that is executed by the CPU 32.

The program 36 includes an application program and a protocol stack. The application program is a program for allowing the CPU 32 to execute a process on an application layer in the OSI reference model. The protocol stack is a program for allowing the CPU 32 to execute a process on a lower layer below the application layer in the OSI reference model. The protocol stack is a program for executing a process complying with the NFC standard defined by the NFC forum. The protocol stack includes a P2P (an abbreviation of Peer to Peer) program for executing a process according to a P2P mode of the NFC standard. Note that the protocol stack may or may not include an R/W (an abbreviation of Reader/Writer) program for executing a process according to an R/W mode of the NFC standard. Furthermore, the protocol stack may or may not include a CE (an abbreviation of Card Emulation) program for executing a process according to a CE mode of the NFC standard.

In the following description, the devices capable of executing the NFC scheme communication (the MFP 10, the portable terminals 50, 52, etc.) are referred to as "NFC devices". Among these NFC devices are a device capable of using all three modes, the P2P mode, the R/W mode and the CE mode, and a device capable of using only one or two modes out of these three modes. In the present embodiment, because the program 36 of the MFP 10 includes the P2P program, the MFP 10 can use at least the P2P mode. The portable terminals 50, 52, too, can use at least the P2P mode.

The P2P mode is a mode for executing two-way communication between a pair of NFC devices. For instance, suppose that a first NFC device and a second NFC device are operated according to the P2P mode. In such a case, a communication link for executing communication according to the P2P mode is established between the first NFC device and the second NFC device. Note that the communication link for executing the communication according to the P2P mode is referred hereinafter as "LLCP (an abbreviation of Logical Link Control Protocol) connection". For example, the first NFC device sends first data to the second NFC device by using the LLCP connection. Thereafter, the second NFC device normally sends second data to the first NFC device by using the same LLCP connection. Two-way communication is realized therebetween in this manner.

Note that the NFC device of type A in ISO/IEC 1443 defined by the NFC forum and the NFC device of type F in ISO/IEC 18092 can be operated according to the P2P mode. However, the NFC device of type B in ISO/IEC 1443 cannot be operated according to the P2P mode.

In a case where the LLCP connection is established between the pair of NFC devices, the pair of communication devices normally establishes an SNEP (an abbreviation of Simple NDEF (NFC data exchange format) Exchange Protocol) connection therebetween. In the SNEP connection, one of the pair of NFC devices operates as a server, and the other one as a client. Whether each of these NFC devices operates as a server or a client depends on the respective states of the NFC devices.

For example, in a case where the state of the MFP 10 is a state in which a server function according to the SNEP is being valid and the state of the portable terminal 50 is a state in which a client function according to the SNEP is being valid, SNEP connection is established in which the MFP 10 operates as a server and the portable terminal 50 operates as a client (described as "SNEP connection of MFP(S)-terminal(C)" hereinafter). In addition, in a case where, for example, the state of the MFP 10 is a state in which the client function according to the SNEP is being valid and the state of the portable terminal 50 is a state in which the server function according to the SNEP is being valid, SNEP connection is established in which the MFP 10 operates as the client and the portable terminal 50 operates as the server (described as "SNEP connection of MFP(C)-terminal(S)" hereinafter).

Additionally, in a case where, for example, the state of the MFP 10 is a state in which both the server function and the client function according to the SNEP are being valid and the state of the portable terminal 50 is a state in which the server function and the client function according to the SNEP are being valid, both the SNEP connection of MFP(S)-terminal(C) and the SNEP connection of MFP(C)-terminal(S) are established. Note that the server function according to the SNEP and the client function according to the SNEP are simply described hereinafter as "server function" and "client function" respectively.

In the present embodiment, while the power of the MFP 10 is ON, the MFP 10 keeps the state in which both the server function and the client function are being valid. Therefore, whether the SNEP connection of MFP(S)-terminal(C) is established or the SNEP connection of MFP(C)-terminal(S) is established depends on the state of the communication partner (i.e., the portable terminal 50, 52). In other words, the both SNEP connections are established when the communication partner is in the state in which both the server function and the client function are being valid. On the other hand, only the SNEP connection of MFP(C)-terminal(S) is established when the communication partner is in a state in which only the server function is being valid. Further, only the SNEP connection of MFP(S)-terminal(C) is established when the communication partner is in a state in which only the client function is being valid.

In each SNEP connection, the NFC device operating as a client (simply referred to as "client" hereinafter) sends a request command to the NFC device operating as a server (simply referred to as "server" hereinafter). For example, the client can send target data thereof to the server by using a PUT command. To be specific, the client sends a PUT request and the target data to the server. Consequently, the server can receive the target data from the client and use the target data. Also, for instance, the client can receive target data of the server from the server by using a GET command. Specifically, the client sends a GET request to the server. In this case, the server sends a GET response and the target data to the client. Consequently, the client can receive the target data from the server and use the target data. Note that the server cannot send the PUT request or GET request, but executes a process corresponding to the PUT request or GET request (such as sending the GET response responsive to the GET request). In this manner, the client handles communication of target data, whereas the server communicates the target data in response to the operation of the client in the SNEP connection.

(Configuration of Portable Terminals 50, 52)

The portable terminals 50, 52 are transportable terminals such as, e.g., a mobile phone (e.g., smart phone), PDA, notebook PC, tablet PC, portable music playback device, portable film playback device, etc. The portable terminals 50, 52 each comprise a network I/F and an NFC I/F for connecting with a wireless network. Consequently, the portable terminals 50, 52 are each capable of performing a wireless communication with the MFP 10 via the network I/F, and a wireless communication with the MFP 10 by using the NFC I/F.

An application program (called "application for MFP" below) for causing the MFP 10 to execute various functions (e.g., print function, scan function, etc.) can be installed on each of the portable terminals 50, 52. Moreover, in the present embodiment, the application for MFP is installed on the portable terminals 50, 52 from an internet server (not shown) provided by a vendor of the MFP 10.

The portable terminal 50 has a first operation system (OS) program. The first OS program is of version 4.0 of Android (registered trademark). The first OS program operates the portable terminal 50 as follows. In other words, while the power of the portable terminal 50 is ON, the portable terminal 50 keeps a valid state of the server function. In a case where a MFP application is not installed in the portable terminal 50, the portable terminal 50 keeps an invalid state of the client function. Even when the MFP application is installed in the portable terminal 50, but when the MFP application is not active, the portable terminal 50 keeps the invalid state of the client function. Once the MFP application is activated, the portable terminal 50 validates the client function. When the MFP application is ended (i.e., in a state in which the MFP application is not active), the portable terminal 50 invalidates the client function.

The portable terminal 52 has a second OS program different from the first OS program. The second OS program operates the portable terminal 52 as follows. In other words, when the MFP application is not installed in the portable terminal 52, and while the power of the portable terminal 52 is ON, the portable terminal 52 keeps the invalid states of both the server function and the client function. Even when the MFP application is installed in the portable terminal 52, but when the MFP application is not active, the portable terminal 52 keeps the invalid states of both the server function and the client function. Once the MFP application is activated, the portable terminal 52 validates the client function. When the MFP application is ended (i.e., in a state in which the MFP application is not active), the portable terminal 52 invalidates the client function.

(Poll Operation and Listen Operation)

Next, a Poll operation and a Listen operation executed by the NFC device will be described. For example, in the MFP 10, the CPU 32 does not execute the Poll operation and the Listen operation according to the program, but the NFC I/F 22 executes the Poll operation and the Listen operation. The Poll operation is an operation in which a polling signal is sent, and a response signal in response to the polling signal is received. Further, the Listen operation is an operation in which a polling signal is received, and a response signal in response to the polling signal is sent.

The NFC I/F 22 of the MFP 10 is capable of operating in any mode of Poll mode for executing the Poll operation, Listen mode for executing the Listen operation, and a mode in which neither the Poll operation nor the Listen operation are executed (called "non-execution mode" below). The NFC I/F 22 operates sequentially in the Poll mode, the Listen mode, and the non-execution mode. For example, the NFC I/F 22 executes one set of operations in which the NFC I/F 22 operates in the Poll mode, then operates in the Listen mode, and then operates in the non-execution mode. The NFC I/F 22 repeatedly executes the one set of operations.

In the Poll mode, the NFC I/F 22 sends a polling signal and monitors receipt of a response signal. In the Listen mode, the NFC I/F 22 monitors receipt of a polling signal, and, once the polling signal is received, sends a response signal. In the non-execution mode, the NFC I/F 22 does not send a polling signal, and the NFC I/F 22 does not send a response signal even when receiving a polling signal.

The portable terminals 50, 52 both repeatedly execute this set of operations described above. Therefore, when, for example, the distance between the MFP 10 and the portable terminal 50 is less than 10 cm, and when a period for which the NFC I/F 22 of the MPF 10 is operated in the Poll mode matches a period for which the portable terminal 50 is operated in the Listen mode, the NFC I/F 22 executes a Poll operation for sending a polling signal to the portable terminal 50 and receiving a response signal from the portable terminal 50. When, for instance, the distance between the MFP 10 and the portable terminal 50 is less than 10 cm, and when a period for which the NFC I/F 22 is operated in the Listen mode matches a period for which the portable terminal 50 is operated in the Poll mode, the NFC I/F 22 executes a Listen operation for receiving a polling signal from the portable terminal 50 and sending a response signal to the portable terminal 50.

In the present embodiment, the MFP 10 and the portable terminals 50, 52 can be operated according to the P2P mode. Therefore, when the MFP 10 and the portable terminal (i.e., the portable terminal 50 or 52) execute the Poll operation and the Listen operation, a communication link for executing communication according to the P2P mode, which is, in other words, the LLCP connection, is established. To be more specific, the NFC device that has executed the Poll operation (referred to as "Poll device" hereinafter) sends an Activation command corresponding to the P2P mode to the NFC device that has executed the Listen operation (referred to as "Listen device" hereinafter). Next, in response to the Activation command from the Poll device, the Listen device sends an OK command to the Poll device. As a result, the LLCP connection is established between the MFP 10 (i.e., the Poll device or the Listen device) and the portable terminal (i.e., the Listen device or the Poll device). Subsequently, the SNEP connection corresponding to the states of these devices (i.e., the SNEP connection of MFP(S)-terminal (C) and/or the SNEP connection of MFP(C)-terminal(S)) is established between the MFP 10 and the portable terminal.

Figure 2:
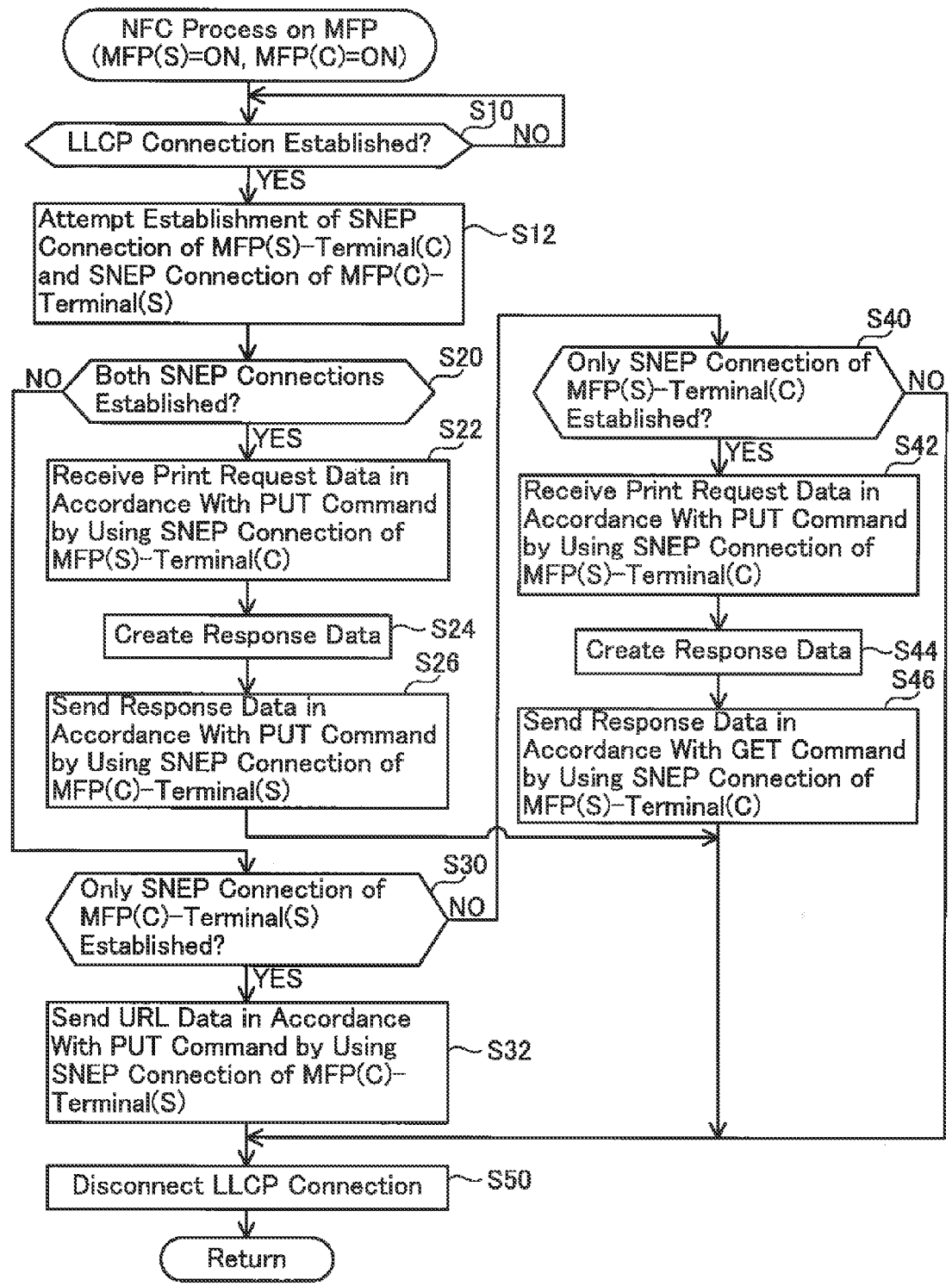
FIG. 2 shows a flowchart of a NFC process on MFP according to a first embodiment.

(NFC Process on MFP; FIG. 2)

Next, the details of a process executed by the CPU 32 of the MFP 10 according to the program 36 are described with reference to FIG. 2. The CPU 32 executes the process shown in FIG. 2 once the power of the MFP 10 is turned ON. As described above, while the power of the MFP 10 is ON, the MFP 10 keeps the valid states of the server function and the client function (i.e., MFP(S)=ON, MFP(C)=ON).

In S10, the CPU 32 monitors that the LLCP connection is established between the MFP 10 and the portable terminal (i.e., either one of the portable terminals 50 and 52). When communication of an Activation command and an OK command is executed according to the P2P mode, the LLCP connection is established between the MFP 10 and the portable terminal, as described above. In this case, the CPU 32 determines that the result of S10 is YES, and proceeds to S12.

In S12, the CPU 32 attempts to establish the SNEP connection of MFP(S)-terminal(C) and the SNEP connection of MFP(C)-terminal(S). Specifically, in S12, the CPU 32 first attempts to execute first negotiation communication with the portable terminal via the NFC I/F 22 to establish the SNEP connection of MFP(S)-terminal(C). For instance, when the state of the portable terminal is a state in which the client function is being valid, the portable terminal executes the first negotiation communication, resulting in the establishment of the SNEP connection of MFP(S)-terminal(C). On the other hand, when, for example, the state of the portable terminal is a state in which the client function is being invalid, the portable terminal does not execute the first negotiation communication. Thus, the SNEP connection of MFP(S)-terminal(C) is not established.

In S12, the CPU 32 further attempts to execute second negotiation communication with the portable terminal via the NFC I/F 22 to establish the SNEP connection of MFP (C)-terminal(S). For instance, when the state of the portable terminal is a state in which the server function is being valid, the portable terminal executes the second negotiation communication, resulting in the establishment of the SNEP connection of MFP(C)-terminal(S). On the other hand, when, for example, the state of the portable terminal is a state in which the server function is being invalid, the portable terminal does not execute the second negotiation communication. Thus, the SNEP connection of MFP(C)-terminal(S) is not established.

Next, in S20, the CPU 32 determines whether both the SNEP connection of MFP(S)-terminal(C) and the SNEP connection of the MFP(C)-terminal(S) are established or not. When the both SNEP connections are established, the CPU 32 determines that the result of S20 is YES, and proceeds to S22. When, on the other hand, only one of the SNEP connections is established or neither one of the SNEP connections is established, the CPU 32 determines that the result of S20 is NO, and proceeds to S30.

In S22, the CPU 32 receives a PUT request and print request data from the portable terminal via the NFC I/F 22 by using uses the SNEP connection of MFP(S)-terminal(C). In the present embodiment, the print request data includes a print instruction command for causing the MFP 10 to execute a print function. Note that the print request data does not include print data itself, which is data to be printed.

As described above, the NFC scheme communication speed is lower than the speed of network wireless communication. Therefore, the use of the NFC scheme communication for communicating the print data from the portable terminal to the MFP 10 is likely to take a long time to communicate the print data. Therefore, the present embodiment adopts a configuration in which the MFP 10 receives the print data from the portable terminal 50 by using network wireless communication. In order to adopt such a configuration, the portable terminal 50 is required to know the wireless setting for executing network wireless communication with the MFP 10. Thus, when receiving the print request data including the print instruction data from the portable terminal, the MFP 10 sends the wireless setting to the portable terminal, as response data responsive to the print instruction command.

In other words, in S24, the CPU 32 reads the print instruction command included in the print request data, and then specifies, from the memory 34, the wireless setting used in the wireless network to which the MFP 10 currently belongs. Subsequently, the CPU 32 creates response data complying with the SNEP communication scheme. In so doing, the CPU 32 creates the response data including the specified wireless setting.

In the next S26, the CPU 32 sends a PUT request and the created response data to the portable terminal via the NFC I/F 22 by using the SNEP connection of MFP(C)-terminal(S). Consequently, the portable terminal can participate in the wireless network by using the wireless setting included in the response data. As a result, the MFP 10 and the portable terminal can execute the network wireless communication in place of the NFC scheme communication, to communicate the print data. In other words, the MFP 10 can receive the print data from the portable terminal and execute the print function.

On completion of S26, in S50 the CPU 32 disconnects the LLCP connection established in S10. For instance, in a case where the LLCP connection is established when the MFP 10 is a Poll device, in S50 the CPU 32 sends a Deactivation command to the portable terminal via the NFC I/F 22 and receives an OK command from the portable terminal via the NFC I/F 22. As a result, the LLCP connection is disconnected. On the other hand, in a case where the LLCP connection is established when the MFP 10 is a Listen device, in S50 the CPU 32 receives a Deactivation command from the portable terminal via the NFC I/F 22 and sends an OK command to the portable terminal via the NFC I/F 22. As a result, the LLCP connection is disconnected. Note that once the LLCP connection is disconnected, the SNEP connection is disconnected as well. On completion of S50, the CPU 32 returns to S10.

In S30, the CPU 32 determines whether only the SNEP connection of MFP(C)-terminal(S) is established or not. When only the SNEP connection of MFP(C)-terminal(S) is established, the CPU 32 determines that the result of S30 is YES, and proceeds to S32. When, on the other hand, only the SNEP connection of MFP(S)-terminal(C) is established, or neither one of the SNEP connections is established, the CPU 32 determines that the result of S30 is NO, and proceeds to S40.

In S32, the CPU 32 sends a PUT request and URL (an abbreviation of Uniform Resource Locator) data to the portable terminal via the NFC I/F 22 by using the SNEP connection of MFP(C)-terminal(S). As described above, the Internet server provided by the vendor of the MFP 10 stores the MFP application therein, and allows the external device to download and install the MFP application upon request from the external device. The URL data sent in S32 indicates the URL for the MFP application (i.e., the file address of the MFP application stored in the Internet server). The URL data includes a smart poster command defined in the NFC standard. An operation that is executed by the portable terminal upon receipt of the URL data is described hereinafter in detail. On completion of S32, the CPU 32 proceeds to S50.

In S40, the CPU 32 determines whether only the SNEP connection of MFP(S)-terminal(C) is established or not. When only the SNEP connection of MFP(S)-terminal(C) is established, the CPU 32 determines that the result of S40 is YES, and proceeds to S42. When, on the other hand, neither one of the SNEP connections is established, the CPU 32 determines that the result of S40 is NO, and proceeds to S50.

In S42, the CPU 32 receives a PUT request and print request data from the portable terminal via the NFC I/F 22 by using the SNEP connection of MFP(S)-terminal(C). The print request data received in S42 is the same as the print request data received in S22.

In the next step S44, the CPU 32 creates response data including wireless setting, as in S24. In the subsequent step S46, the CPU 32 receives a GET request from the portable terminal via the NFC I/F 22 by using the SNEP connection of MFP(S)-terminal(C). In S46, the CPU 32 further sends a GET response and the created response data to the portable terminal via the NFC I/F 22, by using the SNEP connection of MFP(S)-terminal(C). On completion of S46, the CPU 32 proceeds to S50.

(Specific Cases)

Specific cases A1 to A3 to be realized by the present embodiment are described next. The cases A1 to A3 are realized by allowing the MFP 10 to execute each of the steps shown in FIG. 2. In each of the cases A1 to A3, the communications associated with the SNEP connection of MFP(S)-terminal(C) are indicated by dashed lines, and the communications associated with the SNEP connection of MFP(C)-terminal(S) are indicated by chain lines. This feature applies to FIGS. 7 to 9 of a second embodiment described hereinafter.

(Case A1; FIG. 3)

The case A1 illustrates communications executed between the MFP 10 and the portable terminal 50 having the first OS program. As described above, while the power of the MFP 10 is ON, the MFP 10 keeps the valid states of the server function and the client function (i.e., MFP(S)=ON, MFP(C)=ON). In addition, while the power of the portable terminal 50 is ON, the portable terminal 50 keeps the valid state of the server function (i.e., terminal (S)=ON). The portable terminal 50 already has the MFP application installed therein. The user of the portable terminal 50 adds, to the portable terminal 50, an operation for activating the MFP application. Consequently, the portable terminal 50 validates the client function (i.e., terminal(C)=ON).

The user of the portable terminal 50 adds an operation for causing the MFP 10 to execute the print function, to the portable terminal 50, by following the screen of the MFP application. The user then brings the portable terminal 50 close to the MFP 10. As a result, the LLCP connection is established between the MFP 10 and the portable terminal 50 (YES in S10 of FIG. 2). In the MFP 10 both the server function and the client function are valid, and in the portable terminal 50 both the server function and the client function are valid. For this reason, both the SNEP connection of MFP(S)-terminal(C) and the SNEP connection of MFP(C)-terminal(S) are established between the MFP 10 and the portable terminal 50 (YES in S20).

The portable terminal 50 creates the print request data in accordance with the MFP application. The portable terminal 50 sends a PUT request and the created print request data to the MFP 10 by using the SNEP connection of MFP(S)-terminal(C).

The MFP 10 receives the PUT request and the print request data from the portable terminal 50 by using the SNEP connection of MFP(S)-terminal(C) (S22). Subsequently, the MFP 10 creates response data (S24). The MFP 10 then sends a PUT request and response data to the portable terminal 50 by using the SNEP connection of MFP(C)-terminal(S) (S26).

The portable terminal 50 receives the PUT request and the response data from the MFP 10 by using the SNEP connection of MFP(C)-terminal(S). Consequently, the portable terminal 50 participates in the wireless network by using the wireless setting included in the response data, in accordance with the MFP application. The portable terminal 50 executes the network wireless communication to send the print data to the MFP 10.

The MFP 10 executes the network wireless communication to receive the print data from the portable terminal 50. The print data is then supplied to the print executing unit 18. As a result, the MFP 10 (i.e., the print executing unit 18) prints the image displayed by the print data, onto a print medium.

As described above, in the case A1, when both of the SNEP connections are established, the MFP 10 receives the print request data from the portable terminal 50 by using the SNEP connection of MFP(S)-terminal(C), and thereafter sends the response data to the portable terminal 50 by using the SNEP connection of MFP(C)-terminal(S). Thus, the MFP 10 can appropriately communicate the print request data and response data with the portable terminal 50.

Note in the present embodiment that the first OS program of the portable terminal 50 can use a PUT command but cannot use a GET command. In the case A1, the PUT command is used even in a circumstance where either the print request data or the response data should be communicated. The MFP 10 therefore can appropriately communicate the print request data and the response data with the portable terminal 50.

Figure 4:
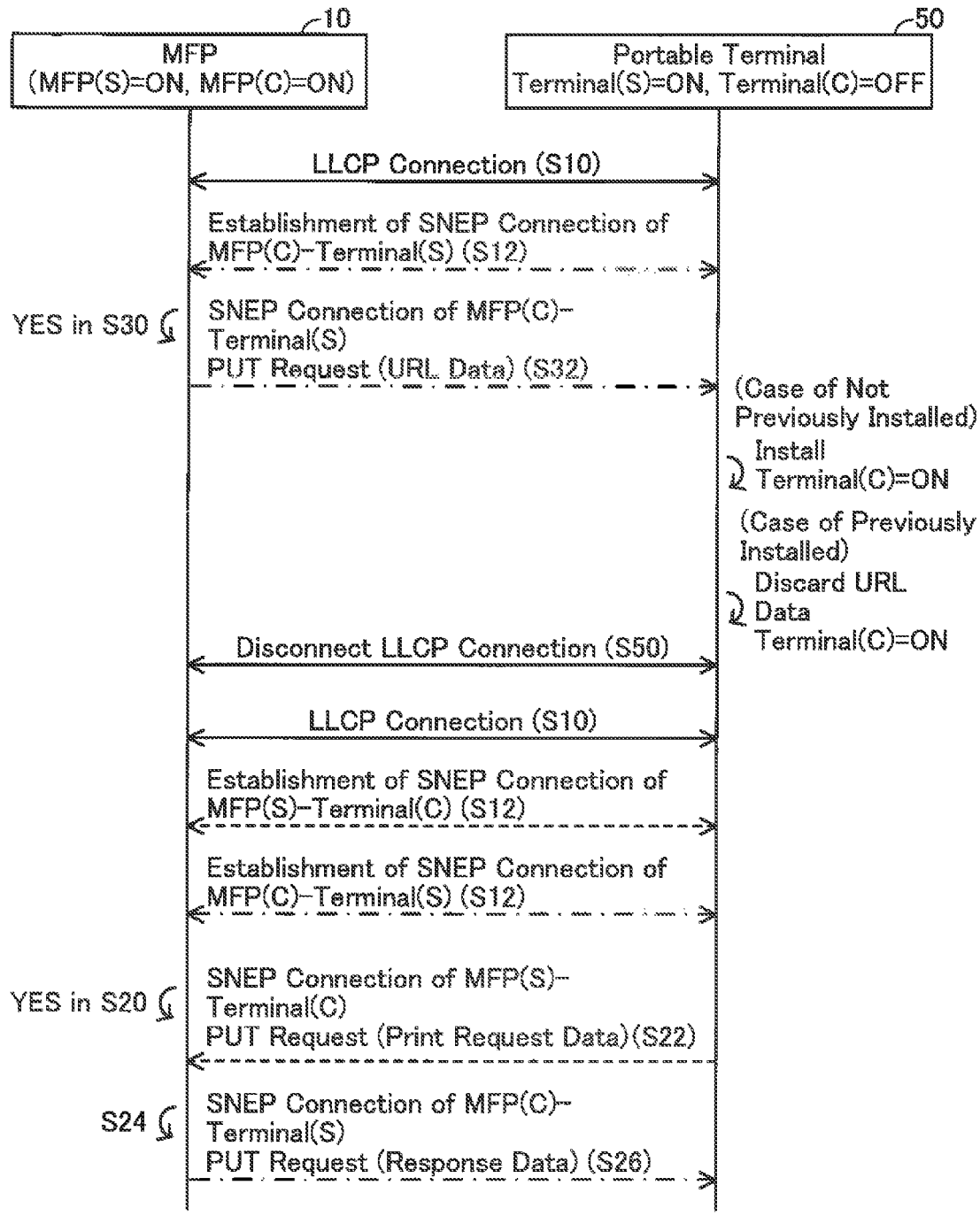
FIG. 4 shows a sequence chart of communication in a case A2.

(Case A2; FIG. 4)

The case A2 illustrates communications executed between the MFP 10 and the portable terminal 50 having the first OS program. The state of the MFP 10 is the same as that described in the case A1 shown in FIG. 3 (i.e., MFP(S)=ON, MFP(C)=ON). The portable terminal 50 does not have the MFP application previously installed therein. Alternatively, the portable terminal 50 has the MFP application installed therein but does not activate the MFP application. Thus, although the server function is valid in the portable terminal 50, the client function is invalid (i.e., terminal(S)=ON, terminal(C)=OFF).

The LLCP connection is established between the MFP 10 and the portable terminal 50 (YES in S10 of FIG. 2). In the MFP 10, both the server function and the client function are valid. In the portable terminal 50, only the server function is valid. Hence, only the SNEP connection of MFP(C)-terminal(S) is established between the MFP 10 and the portable terminal 50 (NO in S20, YES in S30).

The MFP 10 sends a PUT request and URL data to the portable terminal 50 by using the SNEP connection of MFP(C)-terminal(S) (S32). Subsequently, the LLCP connection is disconnected (S50).

The portable terminal 50 receives the PUT request and URL data from the MFP 10 by using the SNEP connection of MFP(C)-terminal(S). The portable terminal 50 consequently reads the smart poster command that is included in the URL data, in accordance with the first OS program.

In the case where the MFP application is not previously installed in the portable terminal 50, first and second examples below are realized. In the first example, the portable terminal 50 reads the smart poster command, automatically accesses the URL included in the URL data (i.e., the internet server storing the MFP application), and downloads the MFP application from the Internet server. Consequently, the portable terminal 50 can install the MFP application. In the second example, the portable terminal 50 reads the smart poster command, displays a predetermined screen, and then inquires the user whether to access the URL included in the URL data or not. When the user allows access to the URL, the portable terminal 50 downloads the MFP application from the Internet server. As a result, the portable terminal 50 can install the MFP application. Once the MFP application is installed, the portable terminal 50 activates the MFP application. As a result, the portable terminal 50 validates the client function. In other words, both the server function and the client function are being valid in the portable terminal 50.

In the case where the MFP application is already installed in the portable terminal 50, the portable terminal 50 discards the URL data and does not download the MFP application after reading the smart poster command. However, the portable terminal 50 activates the MFP application after reading the smart poster command. As a result, the portable terminal 50 validates the client function. In other words, both the server function and the client function are being valid in the portable terminal 50.

As with the case A1 shown in FIG. 3, the user of the portable terminal 50 adds, to the portable terminal 50, the operation for causing the MFP 10 to execute the print function, and then brings the portable terminal 50 close to the MFP 10. As a result, the LLCP connection is reestablished between the MFP 10 and the portable terminal 50 (YES in S10 of FIG. 2). Because both the server function and the client function are valid in the portable terminal 50, both of the SNEP connections are established (YES in S20). The subsequent operations are the same as those of the case A1 shown in FIG. 3.

As described above, in the case A2, when only the SNEP connection of MFP(C)-terminal(S) is established, the MFP 10 sends the URL data to the portable terminal 50 by using the SNEP connection of MFP(C)-terminal(S). Therefore, in the case where the MFP application is not previously installed in the portable terminal 50, the portable terminal 50 uses the URL data to install the MFP application and to activate the MFP application. In the case where the MFP application is already installed in the portable terminal 50, the portable terminal 50 does not download the MFP application but activates the MFP application. As a result of activating the MFP application, the invalid client function of the portable terminal 50 becomes valid. Therefore, by sending the URL data to the portable terminal 50, the MFP 10 can appropriately validate the client function of the portable terminal 50. The MFP 10 can appropriately communicate the print request data and the response data with the portable terminal 50.

Furthermore, a PUT command is used for communicating the URL data. The MFP 10 can appropriately communicate the URL data with the portable terminal 50 when the portable terminal 50 cannot use a GET command. Thus, the MFP 10 can appropriately communicate the print request data and the response data with the portable terminal 50.

Figure 5:
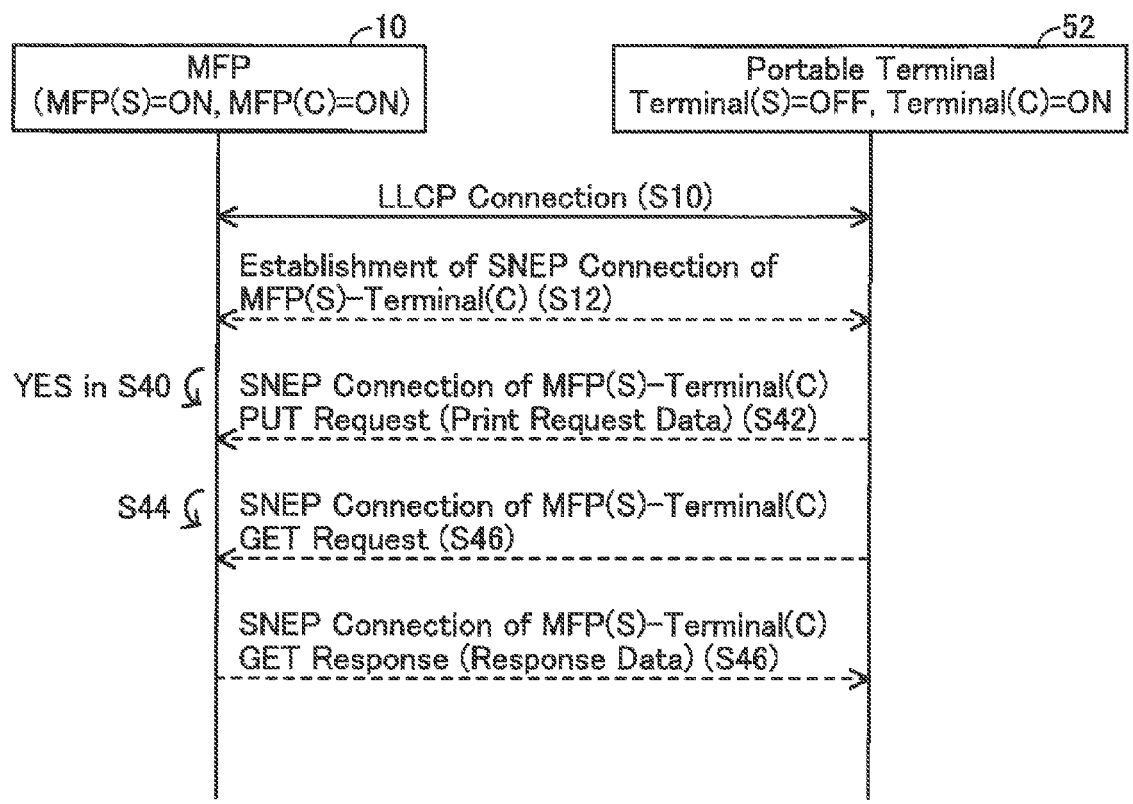
FIG. 5 shows a sequence chart of communication in a case A3.

(Case A3; FIG. 5)

The case A3 illustrates communications executed between the MFP 10 and the portable terminal 52 having the second OS program. The state of the MFP 10 is the same as that described in the case A1 shown in FIG. 3 (i.e., MFP(S)=ON, MFP(C)=ON). While the power of the portable terminal 52 is ON, the portable terminal 52 keeps the invalid state of the server function (i.e., terminal(S)=OFF). Also, the portable terminal 52 has the MFP application previously installed therein. The user of the portable terminal 52 adds, to the portable terminal 52, an operation for activating the MFP application. Accordingly, the portable terminal 52 validates the client function (i.e., terminal(C)=ON).

The user of the portable terminal 52 adds, to the portable terminal 52, an operation for causing the MFP 10 to execute the print function, by following the screen of the MFP application. The user then brings the portable terminal 52 close to the MFP 10. As a result, the LLCP connection is established between the MFP 10 and the portable terminal 52 (YES in S10 of FIG. 2). In the MFP 10 both the server function and the client function are valid, and in the portable terminal 52 only the client function is valid. For this reason, only the SNEP connection of MFP(S)-terminal(C) is established between the MFP 10 and the portable terminal 52 (NO in S20, NO in S30, YES in S40).

The portable terminal 52 creates print request data in accordance with the MFP application. The portable terminal 52 then sends a PUT request and the created print request data to the MFP 10 by using the SNEP connection of MFP(S)-terminal(C).

The MFP 10 receives the PUT request and the print request data from the portable terminal 52 by using the SNEP connection of MFP(S)-terminal(C) (S42). Subsequently, the MFP 10 creates response data (S44).

After sending the print request data to the MFP 10, the portable terminal 52 sends a GET request to the MFP 10 by using the SNEP connection of MFP(S)-terminal(C).

The MFP 10 receives the GET request from the portable terminal 52 by using the SNEP connection of MFP(S)-terminal(C) (S46). Next, the MFP 10 sends a GET response and response data to the portable terminal 52 by using the SNEP connection of MFP(S)-terminal(C) (S46). The subsequent operations are the same as those of the case A1 shown in FIG. 3.

As described above, in the case A3, when only the SNEP connection of MFP(S)-terminal(C) is established, the MFP 10 receives the print request data from the portable terminal 52 by using the SNEP connection of MFP(S)-terminal(C), and thereafter sends response data to the portable terminal 52 by using the SNEP connection of MFP(S)-terminal(C). The MFP 10, therefore, can appropriately communicate the print request data and response data with the portable terminal 52.

Note in the present embodiment that the second OS program of the portable terminal 52 can use both the PUT command and the GET command. Hence, the MFP 10 can appropriately communicate the print request data and the response data with the portable terminal 52 by using the PUT command and the GET command.

Effects of the First Embodiment

According to the present embodiment, the MFP 10 establishes at least either one of the SNEP connection of MFP(S)-terminal(C) and the SNEP connection of MFP(C)-terminal(S), depending on the current states of the MFP 10 and of the portable terminals 50, 52 (i.e., the states concerning validity of the server function and the client function). Then, the MFP 10 executes communication steps of different contents as shown in the cases A1 to A3 of FIGS. 3 to 5, depending on the SNEP connection to be established. Therefore, the MFP 10 can execute an appropriate communication step in accordance with the SNEP connection to be established. According to the present embodiment, the MFP 10 can appropriately communicate the print request data, response data, URL data and the like with the portable terminals 50, 52.

For example, depending on whether the portable terminal 50 with the first OS program has the MFP application installed therein or not, the MFP 10 can execute communication steps of different contents, as shown in the cases A1 and A2. In addition, for example, depending on whether the portable terminal 50 with the first OS program having the MFP application installed therein activates the MFP application or not, the MFP 10 can execute communication steps of different contents, as shown in the cases A1 and A2. While the portable terminal 50 with the first OS program keeps the valid state of the server function, the portable terminal 52 with the second OS program keeps the invalid state of the server function. In such an environment where various portable terminals 50, 52 with different OS programs exist, the MFP 10 can execute communication steps of different contents in accordance of the types of OS programs of the portable terminals 50, 52, as shown in the cases A1 (or A2) and A3.

Moreover, as shown in the case A1 of FIG. 3, when both the SNEP connection of MFP(S)-terminal(C) and the SNEP connection of MFP(C)-terminal(S) are established, the MFP 10 communicates the print request data and the response data sequentially with the portable terminal 50 by sequentially using one of the SNEP connections first and then the other SNEP connection. Furthermore, the MFP 10 communicates the print request data and the response data with the portable terminal 50 in accordance with the same PUT command. Consequently, when the portable terminal 50 can use the PUT command but cannot use the GET command, the MFP 10 can appropriately communicate the print request data and response data with the portable terminal 50.

(Corresponding Relationships)

The MFP 10 and each of the portable terminals 50, 52 are the examples of "communication device" and "external device" respectively. SNEP is the example of "particular protocol". The SNEP connection of MFP(S)-terminal(C) and the SNEP connection of MFP(C)-terminal(S) are the examples of the "first type of connection" and "second type of connection" respectively. Step S12 shown in FIG. 2 is the example of "establishing". Steps S22 and S26, step S32, and steps S42 and S46 are the examples of the "first communicating", "second communicating", and "third communicating" respectively. Steps S24 and S44 are the examples of "performing a process". The print request data received in step S22, the response data sent in step S26, the URL data sent in step S32, the print request data received in step S42, and the response data sent in step S46 are the examples of the "first target data", "second target data", "third target data", "fourth target data", and "fifth target data" respectively. The URL of the MFP application that is included in the URL data sent in step S32 is the examples of "specific data" and "identification information". The print function is the example of "specific function".

Second Embodiment

In the first embodiment, while the power of the MFP 10 is ON, the MFP 10 keeps the valid states of both the server function and the client function. In the present embodiment, on the other hand, while the power of the MFP 10 is ON, the MFP 10 keeps the valid state of the client function; however, as long as step S116 of FIG. 6 described hereinafter is not executed, the MFP 10 keeps the invalid state of the server function. In the present embodiment, the CPU 32 of the MFP 10 executes the NFC process shown in FIG. 6, in place of the NFC process shown in FIG. 2.

Figure 6:
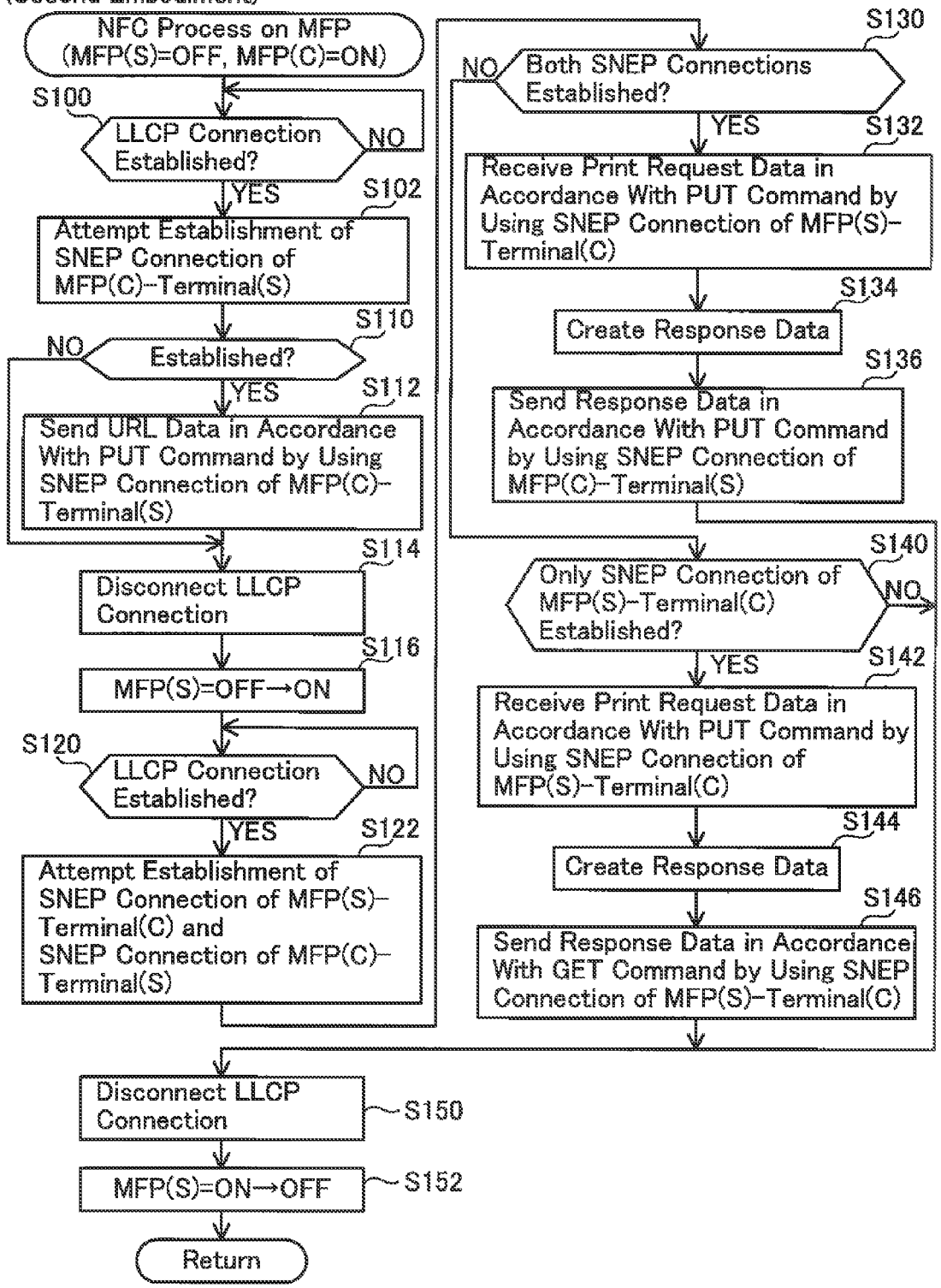
FIG. 6 shows a flowchart of a NFC process on MFP according to a second embodiment.

(NFC Process on MFP; FIG. 6)

S100 is the same as S10 shown in FIG. 2. In S102, the CPU 32 attempts to establish the SNEP connection of MFP(C)-terminal(S). Note that the CPU 32 does not attempt to establish the SNEP connection of MFP(S)-terminal(C) in S102. This is because the server function is made invalid in the MFP 10. In S110, the CPU 32 determines whether the SNEP connection of MFP(C)-terminal(S) is established or not. When the SNEP connection of MFP(C)-terminal(S) is established, the CPU 32 determines that the result of S110 is YES, and proceeds to S112. However, when the SNEP connection of MFP(C)-terminal(S) is not established, the CPU 32 determines that the result of S110 is NO, and skips S112 to proceed to S114.

In S112, the CPU 32 sends a PUT request and URL data to the portable terminal by using the SNEP connection of MFP(C)-terminal(S), as in S32 shown in FIG. 2. On completion of S112, the CPU 32 proceeds to S114.

In S114, the CPU 32 disconnects the LLCP connection, as in S50 shown in FIG. 2. In the subsequent step S116, the CPU 32 changes the invalid state of the server function to the valid state of the server function. As a result, the MFP 10 enters a state in which both the server function and the client function are being valid. On completion of S116, the CPU 32 proceeds to S120.

Steps S120, S122 are the same as steps S10, S12 shown in FIG. 2. In S130, the CPU 32 determines whether both of the SNEP connections are established or not. When both of the SNEP connections are established, the CPU 32 determines that the result of S130 is YES, and proceeds to S132. Steps S132 to S136 are the same as steps S22 to S26 shown in FIG. 2. On completion of S136, the CPU 32 proceeds to S150.

When only one of the SNEP connections is established, or when neither one of the SNEP connections is established, the CPU 32 determines that the result of S130 is NO, and proceeds to S140. In S140, the CPU 32 determines whether only the SNEP connection of MFP(S)-terminal(C) is established or not. When only the SNEP connection of MFP(S)-terminal(C) is established, the CPU 32 determines that the result of S140 is YES, and proceeds to S142. Steps S142 to S146 are the same as steps S42 to S46 shown in FIG. 2. On completion of S146, the CPU 32 proceeds to S150.

When only the SNEP connection of MFP(C)-terminal(S) is established, or when neither one of the SNEP connections is established, the CPU 32 determines that the result of S140 is NO, and proceeds to S150.

In S150 the CPU 32 disconnects the LLCP connection, as in S50 shown in FIG. 2. In the subsequent step S152, the CPU 32 changes the valid state of the server function to the invalid state of the server function. As a result, the MFP 10 enters a state in which only the client function is being valid. On completion of S152, the CPU 32 returns to S100.

(Specific Cases)

Specific cases B1 to B3 realized by the present embodiment are described next. The cases B1 to B3 are realized by allowing the MFP 10 to execute each of the steps shown in FIG. 6.

Figure 7:
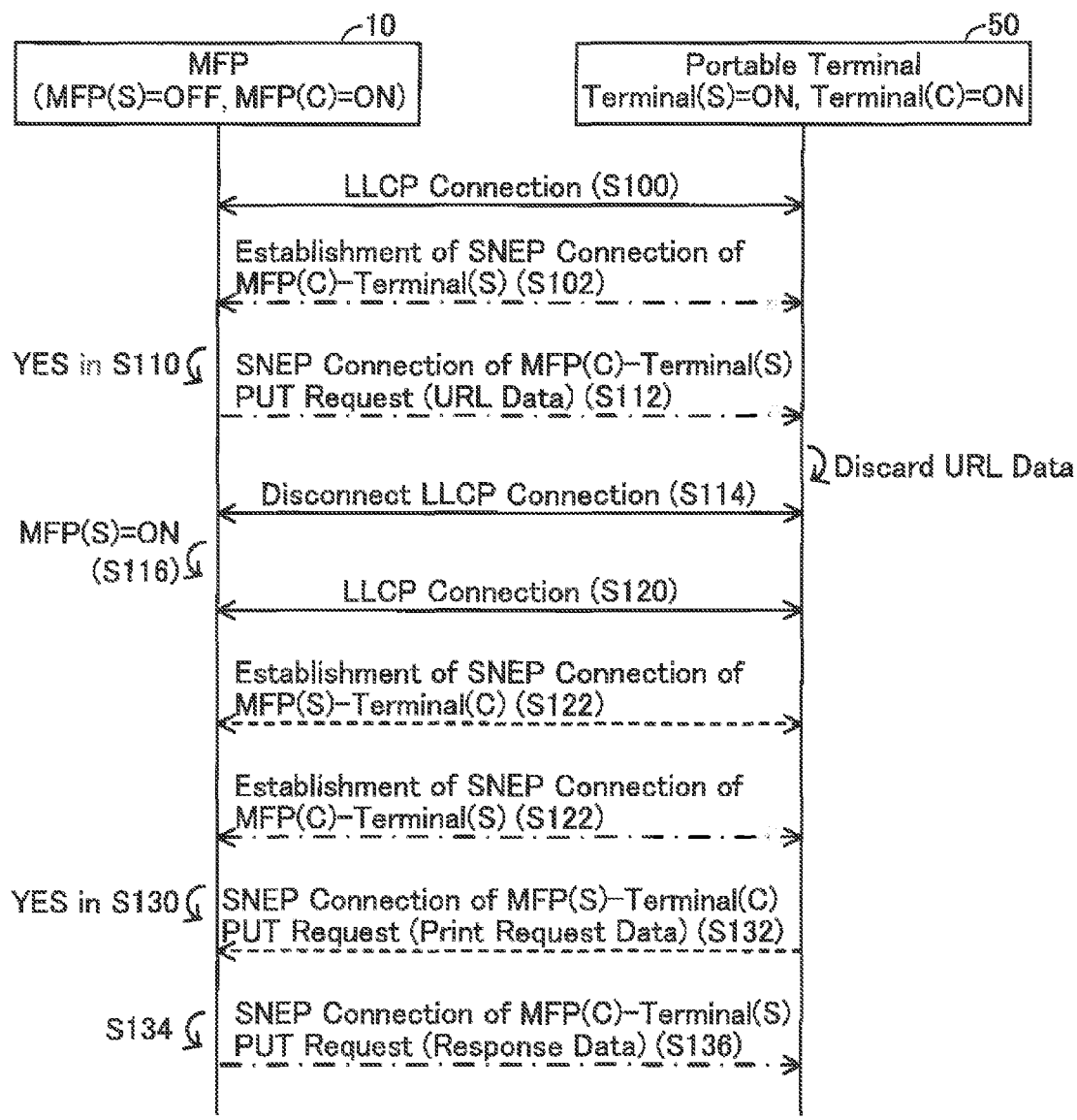
FIG. 7 shows a sequence chart of communication in a case B1.

(Case B1; FIG. 7)

The case B1 illustrates communications executed between the MFP 10 and the portable terminal 50 having the first OS program. As described above, while the power of the MFP 10 is ON, the MFP 10 keeps the valid state of the client function; however, as long as S116 shown in FIG. 6 is not executed, the MFP 10 keeps the invalid state of the server function (i.e., MFP(S)=OFF, MFP(C)=ON). Also, the MFP application is activated by the portable terminal 50. Therefore, both the server function and the client function are validated in the portable terminal 50 (i.e., terminal(S)=ON, terminal(C)=ON).

The LLCP connection is established between the MFP 10 and the portable terminal 50 (YES in S100 of FIG. 6). In the MFP 10, only the client function is valid. In the portable terminal 50, both the server function and the client function are valid. For this reason, only the SNEP connection of MFP(C)-terminal(S) is established between the MFP 10 and the portable terminal 50 (S102, YES in S110).

The MFP 10 sends a PUT request and URL data to the portable terminal 50 by using the SNEP connection of MFP(C)-terminal(S) (S112).

The portable terminal 50 receives the PUT request and the URL data from the MFP 10 by using the SNEP connection of MFP(C)-terminal(S). The portable terminal 50 consequently reads the smart poster command included in the URL data, in accordance with the first OS program. However, the portable terminal 50 already has the MFP application installed therein. Thus, the portable terminal 50 discards the URL data and does not download the MFP application.

The MFP 10 temporarily disconnects the LLCP connection established between the MFP 10 and the portable terminal 50 (S114). The MFP 10 thereafter validates the server function (S116). The MFP 10 consequently enters a state in which both the server function and the client function are valid. Then, the MFP 10 reestablishes the LLCP connection between the MFP 10 and the portable terminal 50 (YES in S120 of FIG. 6). In the MFP 10 both the server function and the client function are valid. In the portable terminal 50 both the server function and the client function are valid. For this reason, both of the SNEP connections are established between the MFP 10 and the portable terminal 50 (S122, YES in S130).

The portable terminal 50 creates print request data in accordance with the MFP application. The portable terminal 50 then sends a PUT request and the created print request data to the MFP 10 by using the SNEP connection of MFP(S)-terminal(C).

The MFP 10 receives the PUT request and the print request data from the portable terminal 50 by using the SNEP connection of MFP(S)-terminal(C) (S132). Subsequently, the MFP 10 creates response data (S134). Next, the MFP 10 sends a PUT request and the response data to the portable terminal 50 by using the SNEP connection of MFP(C)-terminal(S) (S136). The subsequent operations are the same as those of the case A1 shown in FIG. 3. The case B1 can achieve the same effects as those of the case A1 shown in FIG. 3.

Figure 8:
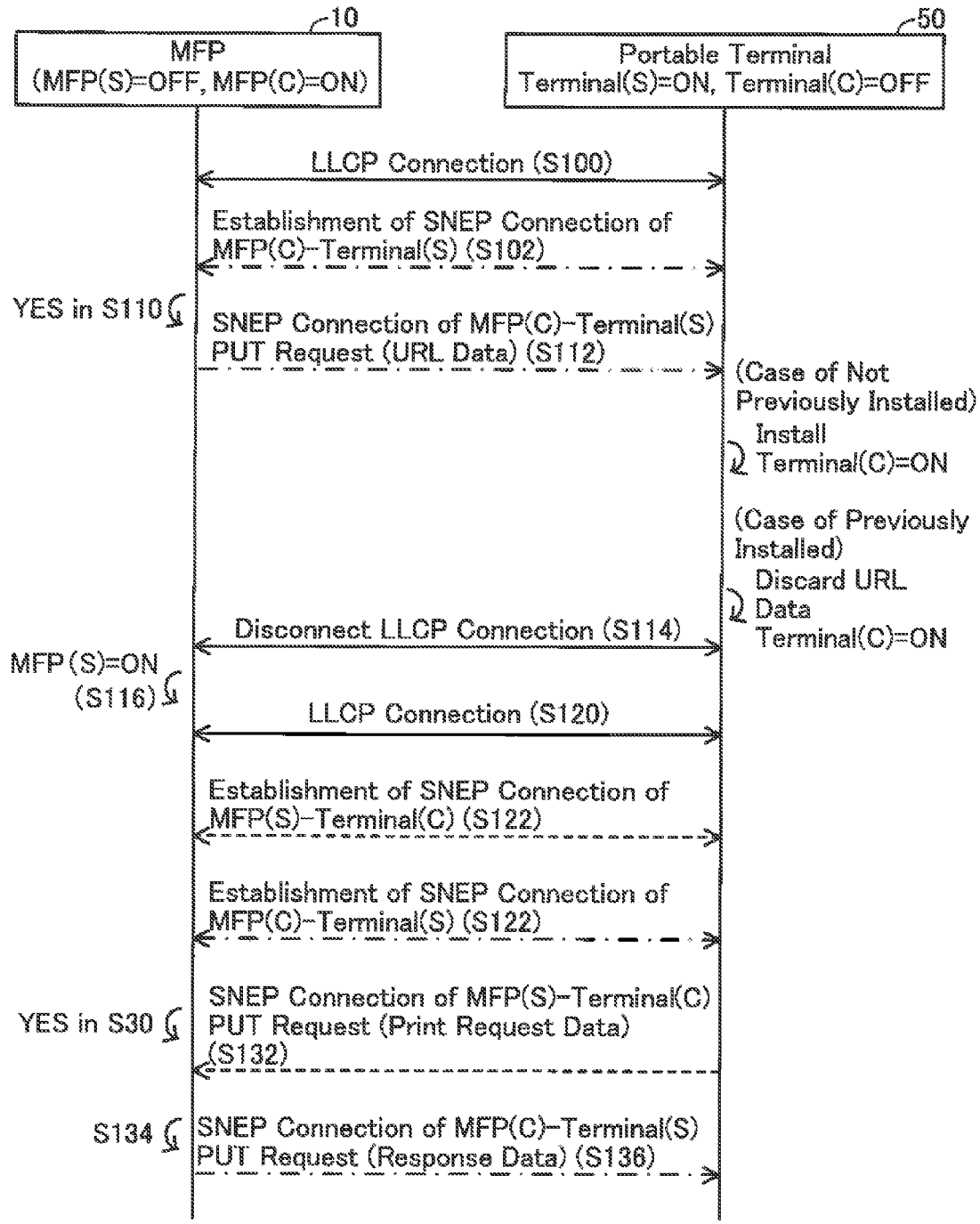
FIG. 8 shows a sequence chart of communication in a case B2.

(Case B2; FIG. 8)

The case A2 illustrates communications executed between the MFP 10 and the portable terminal 50 having the first OS program. The state of the MFP 10 is the same as that described in the case B1 shown in FIG. 7 (i.e., MFP(S)=OFF, MFP(C)=ON). The portable terminal 50 does not have the MFP application previously installed therein. Alternatively, the portable terminal 50 has the MFP application previously installed therein but does not have the MFP application activated. Thus, in the portable terminal 50, the server function is valid, but the client function is invalid (i.e., terminal(S)=ON, terminal(C)=OFF).

The LLCP connection is established between the MFP 10 and the portable terminal 50 (YES in S100 shown in FIG. 6). In the MFP 10, only the client function is valid. In the portable terminal 50, only the server function is valid. Thus, only the SNEP connection of MFP(C)-terminal(S) is established between the MFP 10 and the portable terminal 50 (S102, YES in S110).

The MFP 10 sends a PUT request and URL data to the portable terminal 50 by using the SNEP connection of MFP(C)-terminal(S) (S112).

The portable terminal 50 receives the PUT request and the URL data from the MFP 10 by using the SNEP connection of MFP(C)-terminal(S). As with the case A2 shown in FIG. 4, in a case where the portable terminal 50 does not have the MFP application previously installed therein, the portable terminal 50 installs and activates the MFP application. In a case where the portable terminal 50 already has the MFP application installed therein, the portable terminal 50 does not download the MFP application, but activates the MFP application. As a result, the portable terminal 50 validates the client function. In other words, the portable terminal 50 have both the server function and the client function validated.

The MFP 10 temporarily disconnects the LLCP connection established between the MFP 10 and the portable terminal 50 (S114). Subsequently, the MFP 10 validates the client function (S116). Consequently, the MFP 10 enters a state in which both the server function and the client function are valid. The MFP 10 then reestablishes the LLCP connection between the MFP 10 and the portable terminal 50 (YES in S120 of FIG. 6). In the MFP 10 both the server function and the client function are valid. In the portable terminal 50 both the server function and the client function are valid. For this reason, both of the SNEP connections are established (S122, YES in S130). The subsequent operations are the same as those of the case B1 shown in FIG. 7. The case B2 can achieve the same effects as those of the case A2 shown in FIG. 4.

(Case B3; FIG. 9)

The case A3 illustrates communications executed between the MFP 10 and the portable terminal 52 having the second OS program. The state of the MFP 10 is the same as that described in the case B1 of FIG. 7 (i.e., MFP(S)=OFF, MFP(C)=ON). While the power of the portable terminal 52 is ON, the portable terminal 52 keeps the invalid state of the server function. In the portable terminal 52, the MFP application is active. Thus, only the client function is valid in the portable terminal 52 (i.e., terminal(S)=OFF, terminal(C)=ON).

The LLCP connection is established between the MFP 10 and the portable terminal 52 (YES in S100 of FIG. 6). In the MFP 10 only the client function is valid. In the portable terminal 52 only the client function is valid. For this reason, the SNEP connection of MFP(C)-terminal(S) is not established between the MFP 10 and the portable terminal 52 (S102, NO in S110). Hence, the MFP 10 does not send URL data to the portable terminal 52 (skips S112).

The MFP 10 temporarily disconnects the LLCP connection between the MFP 10 and the portable terminal 52 (S114). The MFP 10 subsequently validates the client function (S116). Thus, the MFP 10 enters a state in which both the server function and the client function are valid. The MFP 10 then reestablishes the LLCP connection between the MFP 10 and the portable terminal 52 (YES in S120 of FIG. 6). In the MFP 10 both the server function and the client function are valid. In the portable terminal 52 only the client function is valid. For this reason, only the SNEP connection of MFP(S)-terminal(C) is established (S122, YES in S140). The subsequent operations are the same as those of the case A3 shown in FIG. 5. The case B3 can achieve the same effects as those of the case A3 shown in FIG. 5.

Effects of the Second Embodiment

The present embodiment can achieve the same effects as those described in the first embodiment. In other words, the MFP 10 executes communication steps of different contents as shown in the cases B1 to B3 of FIGS. 7 to 9, depending on the SNEP connection to be established. Therefore, the MFP 10 can execute an appropriate communication step depending on the SNEP connection to be established. According to the present embodiment, the MFP 10 can appropriately communicate the print request data, response data, URL data and the like with the portable terminals 50, 52.

Furthermore, in a case where both of the SNEP connections are established, the MFP 10 communicates the print request data and response data with the portable terminal 50 in accordance with the same PUT command by sequentially using one of the SNEP connections and then the other SNEP connection, as shown in the case B1 illustrated in FIG. 7. Therefore, in a case where the portable terminal 50 can use a PUT command but cannot use a GET command, the MFP 10 can appropriately communicate the print request data and the response data with the portable terminal 50.

Differences Between First Embodiment and Second Embodiment

As described above, in the first embodiment, the MFP 10 keeps the valid states of both the server function and the client function. In the second embodiment, on the other hand, the MFP 10 keeps the valid state of the client function; however, as long as S116 shown in FIG. 6 is not executed, the MFP 10 keeps the invalid state of the server function.

In the second embodiment, in a circumstance where the portable terminal 50 already has the MFP application installed therein and has the MFP application activated, URL data is sent as soon as the first LLCP connection is established, as shown in the case B1 of FIG. 7. Thereafter, as soon as the second LLCP connection is established, the print request data and response data are communicated. In the first embodiment, on the other hand, in a circumstance where the portable terminal 50 already has the MFP application installed therein and has the MFP application activated, print request data and response data are communicated as soon as the first LLCP connection is established, as shown in the case A1 of FIG. 3. Therefore, according to the first embodiment, the MFP 10 can promptly communicate the print request data and response data with the portable terminal 50 when the first LLCP connection is established, without establishing the LLCP connection twice.

Similarly in the second embodiment, the print request data and response data are communicated as soon as the second LLCP connection is established, as shown in the case B3 of FIG. 9. In the first embodiment, on the other hand, the print request data and response data are communicated as soon as the first LLCP connection is established, as shown in the case A3 of FIG. 5. Therefore, according to the first embodiment, the MFP 10 can promptly communicate the print request data and response data with the portable terminal 52 when the first LLCP connection is established, without establishing the LLCP connection twice.

In the first embodiment, the MFP application not being active in the portable terminal 50 assumes that the invalid state of the client function is kept. However, even when, for example, the MFP application is not active, there is a possibility that the portable terminal 50 validates the client function once another application is activated. Thus, for instance, in a circumstance where the portable terminal 50 does not have the MFP application activated but validates both the server function and the client function (referred to as "specific circumstance," hereinafter), both of the SNEP connections are established by means of the method described in the first embodiment (YES in S20 of FIG. 2). However, because the portable terminal 50 is not operated according to the MFP application, the portable terminal 50 does not send the print request data to the MFP 10. In other words, in the specific circumstance, the print request data and response data might not be communicated between the MFP 10 and the portable terminal 50.

In the second embodiment, on the other hand, only the SNEP connection of MFP(C)-terminal(S) is established once the first LLCP connection is established in the specific circumstance (YES in S110 of FIG. 6). Thus, the MFP 10 sends the URL data to the portable terminal 50 (S112). As a result, the portable terminal 50 activates the MFP application. Thereafter, both of the SNEP connections are established between the MFP 10 and the portable terminal 50 once the second LLCP connection is established (YES in S130), thereby communicating the print request data and response data (S132, S136). Thus, according to the second embodiment, the MFP 10 can appropriately communicate the print request data and response data with the portable terminal 50 in the specific circumstance.

(Corresponding Relationships)

Steps S102, S122 shown in FIG. 6 are the examples of "establishing". In particular, step S102 is the example of "establishing" executed in the "first circumstance", and step S122 is the example of "establishing" executed in the "second circumstance". Step S116 is the example of "changing". Steps S132 and S136, step S112, and steps S142 and S146 are the examples of the "first communicating", "second communicating", and "third communicating" respectively. Steps S134 and S144 are the examples of "performing a process". The print request data received in step S132, the response data sent in step S136, the URL data sent in step S112, the print request data received in step S142, and the response data sent in step S146 are the examples of the "first target data", "second target data", "third target data", "fourth target data", and "fifth target data" respectively.

Modification 1

In S22 and S26 described in FIG. 2, the CPU 32 may communicate the print request data and the response data by using a GET command instead of using a PUT command. In other words, in S22 of FIG. 2 the CPU 32 may send a GET request to the portable terminal 50 and receive a GET response and the print request data from the portable terminal 50 by using the SNEP connection of MFP(C)-terminal(S), as illustrated in the modification of the case A1 shown in FIG. 3. In addition, in S26 of FIG. 2, the CPU 32 may receive a GET request from the portable terminal 50 and send a GET response and the response data to the portable terminal 50 by using the SNEP connection of MFP(S)-terminal(C). Similarly, in S132 and S136 of FIG. 6, the CPU 32 may communicate the print request data and the response data by using a GET command. In other words, a GET command may be used in place of a PUT command in the "first communicating".

Modification 2

When, for example, not taking into consideration of the establishment of both of the SNEP connections (i.e., when not taking into consideration the case A1 shown in FIG. 3), the CPU 32 may not execute steps S20 to S26 shown in FIG. 2. Specifically, without executing the "first communicating", the "second communicating" or "third communicating" may be executed depending on the establishment of the first type of connection or the second type of connection. Also, when the portable terminal that does not have the MFP application activated is not considered as the portable terminal with which the MFP 10 is to communicate (i.e., when not taking into consideration the case A2 shown in FIG. 4), the CPU 32 may not execute steps S30 to S32 shown in FIG. 2. In other words, without executing the "second communicating", the "first communicating" or "third communicating" may be executed depending on the establishment of the first type of connection or the second type of connection. Moreover, when, for example, the portable terminal 52 with the second OS program is not considered as the portable terminal with which the MFP 10 is to communicate, the CPU 32 may not execute steps S40 to S46 shown in FIG. 2. In other words, without executing the "third communicating", the "first communicating" or "second communicating" may be executed depending on the establishment of the first type of connection or the second type of connection. The same modification may be applied to the second embodiment as well. Generally speaking, the processor may execute a communication step of different contents, depending on the establishment of the first type of connection or the second type of connection.

Modification 3

In each of the embodiments described above, the print request data is the example of the "first target data" and "fourth target data", and the response data is the example of the "second target data" and "fifth target data". In place of these embodiments, the following modifications, for example, may be employed.

Modification 3-1

Scan request data that includes a scan instruction command for causing the MFP 10 to execute a scan function may be employed as the "first target data" and/or "fourth target data". In this case, as in the embodiments described above, the response data including the wireless setting may be employed as the "second target data" and/or "fifth target data".

Modification 3-2

Suppose that the portable terminal needs to send setting information to be used by the MFP 10 to the MFP 10. Examples of the setting information include print setting information based on which the MFP 10 executes the print function (e.g., print resolution, paper size, etc.), scan setting information based on which the MFP 10 executes the scan function (e.g., scanning resolution, etc.), and communication setting information based on which the MFP 10 executes a communication function (e.g., IP address, subnet mask, gateway address, etc.). The MFP 10 can execute various functions by using the setting information received from the portable terminal. When receiving the setting information from the portable terminal, the MFP 10 sends a response command indicating the receipt of the setting information to the portable terminal. The setting information may be employed as the "first target data" and/or "fourth target data". The response command mentioned above may be employed as the "second target data" and/or "fifth target data".

Modification 3-3

Suppose that the portable terminal needs to send address information included in an address book of the portable terminal to the MFP 10. The MFP 10 can execute the communication function by using the address information received from the portable terminal. When receiving the address information from the portable terminal, the MFP 10 sends a response command indicating the receipt of the address information to the portable terminal. The address information may be employed as the "first target data" and/or "fourth target data". The response command mentioned above may be employed as the "second target data" and/or "fifth target data".

Modification 3-4

Each of the embodiments employs the configuration in which the MFP 10 receives the print data from the portable terminal by using the network wireless communication. Alternatively, for example, the MFP 10 may receive the print data from the portable terminal by using the NFC communication. In this case, the MFP 10 may send a response command indicating the receipt of the print data. The print data may be employed as the "first target data" and/or "fourth target data". In addition, the response command mentioned above may be employed as the "second target data" and/or "fourth target data".

Modification 4

In each of the embodiments described above, the URL data including the smart poster command is the example of the "third target data." Alternatively, when, for example, the first OS program of the portable terminal 50 is of Android (Registered trademark) (e.g., a program of version 4.0 or subsequent version), the "third target data" may be data that includes an application record of Android. In other words, in S32 shown in FIG. 2 or S112 shown in FIG. 6, the CPU 32 may send the application record in place of the URL data. The application record does not include the URL of the MFP application but includes a package name (i.e., text information) of the MFP application. The portable terminal 50 can install and activate the MFP application by using the package name included in the application record. In the present modification, the application record and the package name are the examples of "specific data" and "identification information" respectively.

Modification 5

Given that the portable terminals 50, 52 already have the MFP applications installed therein, an MFP application activation command (URL not included therein) may be employed as the "third target data" in place of the URL data. In other words, the "third target data" may generally include specific data used for changing the state of the external device from the state in which the client function is being invalid to the state in which the client function is being valid.

Modification 6

When the result of S20 shown in FIG. 2 is YES, the CPU 32 may first send data stored in the MFP 10 (e.g., scan data) to the portable terminal 50 in accordance with a PUT command by using the SNEP connection of MFP(C)-terminal(S), and then receive from the portable terminal 50 a response command indicating the receipt of the data in accordance with the PUT command by using the SNEP connection of MFP(S)-terminal(C). The present modification, too, is the example of "communicating". When the result of S40 shown in FIG. 2 is YES, the CPU 32 may first send the data stored in the MFP 10 (e.g., scan data) to the portable terminal 50 in accordance with a GET command by using the SNEP connection of MFP(S)-terminal(C), and then receive from the portable terminal 50 a response command indicating the receipt of the data in accordance with a PUT command by using the SNEP connection of MFP(S)-terminal(C). The present modification, too, is the example of "communicating". In other words, the processor may generally execute a communication step of different contents, depending on the establishment of the first type of connection or the second type of connection.

Modification 7

The term "communication device" may mean not only a multi-function peripheral capable of executing a print function and a scan function (i.e., the MFP 10), but also a printer capable of executing only the print function out of the print function and the scan function, or a scanner capable of executing only the scan function out of the print function and the scan function. The term "communication device" may also mean a device that executes a function different from the print function and scan function (e.g., an image display function, a data calculation function) (the device being, for example, a PC, a server, a portable terminal (a cellular phone, a smartphone, a PDA, etc.)). In other words, "communication device" includes all sorts of devices capable of executing the NFC scheme communication. Similarly, "external device" also includes all sorts of devices capable of executing the NFC scheme communication.

Modification 8

In the above embodiments, the processes of FIG. 2 and FIG. 6 are realized by software (i.e., the program 36), but at least one of the processes of FIG. 2 and FIG. 6 may be realized by hardware such as a logic circuit, etc.

What is claimed is:

1. A communication device configured to communicate target data with an external device according to an NFC (Near Field Communication) scheme complying with an NFC standard, the communication device comprising:
   an NFC interface configured to operate in accordance with the NFC scheme;
   a network interface which is different from the NFC interface, the network interface being configured to connect to a wireless network;
   a processor; and
   a memory storing computer executable instructions,
      wherein the computer executable instructions, when executed by the processor, cause the communication device to:
         send activation information to the external device via the NFC interface by using a second type of Simple NFC Data Exchange Format Exchange Protocol (SNEP) connection when only the second type of SNEP connection among a first type of SNEP connection and the second type of SNEP connection is established between the communication device and the external device, the first type of SNEP connection being a connection in which the communication device operates as a SNEP server and the external device operates as a SNEP client, the second type of SNEP connection being a connection in which the communication device operates as the SNEP client and the external device operates as the SNEP server, the activation information being for causing the external device to activate an application program to be used by the external device, wherein the application program is configured to send instruction data in order to cause the communication device to execute a specific function, and when the application program is activated by the external device, a state of the external device changes from a state in which the SNEP client is invalid to a state in which the SNEP client is valid;
         after the state of the external device has been changed to the state in which the SNEP client is valid, receive request data from the external device via the NFC interface by using the first type of SNEP connection when both the first type of SNEP connection and the second type of SNEP connection are established between the communication device and the external device;
         in response to receiving the request data, send connection information to the external device, which has the state in which the SNEP client is valid, via the NFC interface by using the second type of SNEP connection when both the first type of SNEP connection and the second type of SNEP connection are established between the communication device and the external device, the connection information including a wireless setting to be used by the external device to participate in the wireless network;
         after the connection information has been sent to the external device, establish a connection via the network interface with the external device by using the connection information;
         after the connection via the network interface with the external device has been established, receive, via the network interface by using the connection, the instruction data from the external device in which the application program is in active; and
execute the specific function when the instruction data is received.

2. The communication device as in claim 1, further comprising:
a print executing unit,
wherein the instruction data is print data, and
wherein the specific function is a print function to be executed by the print executing unit using the print data.

3. The communication device as in claim 1, wherein the activation information includes information for causing the external device to install the application program in a case where the application program has not been installed in the external device.

4. The communication device as in claim 1, wherein the activation information is a uniform resource locator (URL) of the application program.

5. The communication device as in claim 1, wherein:
the activation information is sent to the external device by using the second type of SNEP connection in accordance with a PUT command, and
the connection information is sent to the external device by using the second type of SNEP connection in accordance with a PUT command.

6. The communication device as in claim 1, wherein the computer executable instructions, when executed by the processor, cause the communication device to:
after the activation information has been sent to the external device and the state of the external device has been changed to the state in which the SNEP client is valid, send the connection information to the external device via the NFC interface by using the first type of SNEP connection when only the first type of SNEP connection among the first type of SNEP connection and the second type of SNEP connection is established between the communication device and the external device.

7. The communication device as in claim 6, wherein:
the computer executable instructions, when executed by the processor, cause the communication device to:
after the activation information has been sent to the external device and the state of the external device has been changed to the state in which the SNEP client is valid, receive request data from the external device via the NFC interface by using the first type of SNEP connection when only the first type of SNEP connection among the first type of SNEP connection and the second type of SNEP connection is established between the communication device and the external device, and
in response to receiving the request data, the connection information is sent to the external device via the NFC interface by using the first type of SNEP connection.

8. The communication device as in claim 7, wherein:
the request data is received from the external device by using the first type of SNEP connection in accordance with a PUT command, and
the connection information is sent to the external device by using the first type of SNEP connection in accordance with a GET command.

9. The communication device as in claim 1, wherein the communication device maintains a state in which both of the SNEP server and the SNEP client are valid while a power of the communication device is ON.

10. The communication device as in claim 1, wherein:
only the second type of SNEP connection is established under a first circumstance where a state of the communication device is a state in which only the SNEP client among the SNEP server and the SNEP client is valid,
the computer executable instructions cause the communication device to further execute:
changing, after only the second type of SNEP connection has been established under the first circumstance, a state of the communication device from the state in which only the SNEP client among the SNEP server and the SNEP client is being valid to a state in which both of the SNEP server and the SNEP client are being valid, and
after the state of the communication device has been changed to the state in which both of the SNEP server and the SNEP client are being valid, both the first type of SNEP connection and the second type of SNEP connection are established.

11. A communication device configured to communicate target data with an external device according to an NFC (Near Field Communication) scheme complying with an NFC standard, the communication device comprising:
an NFC interface configured to operate in accordance with the NFC scheme;
a network interface which is different from the NFC interface, the network interface being configured to connect to a wireless network;
an activation module configured to send activation information to the external device via the NFC interface by using a second type of Simple NFC Data Exchange Format Exchange Protocol (SNEP) connection when only the second type of SNEP connection among a first type of SNEP connection and the second type of SNEP connection is established between the communication device and the external device, the first type of SNEP connection being a connection in which the communication device operates as a SNEP server and the external device operates as a SNEP client, the second type of SNEP connection being a connection in which the communication device operates as the SNEP client and the external device operates as the SNEP server, the activation information being configured for causing the external device to activate an application program to be used by the external device, wherein the application program is to send instruction data in order to cause the communication device to execute a specific function, and when the application program is activated by the external device, a state of the external device changes from a state in which the SNEP client is invalid to a state in which the SNEP client is valid;
a connection module configured to:
after the state of the external device has been changed to the state in which the SNEP client is valid, receive request data from the external device via the NFC interface by using the first type of connection when both the first type of SNEP connection and the second type of SNEP connection are established between the communication device and the external device;
in response to receiving the request data, send connection information to the external device, which has the state in which the SNEP client is valid, via the NFC interface by using the second type of SNEP connection when both the first type of SNEP connection and the second type of SNEP connection are established between the communication device and the external device, the connection information including a wireless setting to be used by the external device to participate in the wireless network; and after the connection information has been sent to the external device, establish a connection via the network interface with the external device by using the connection information;

an instruction receiving module configured to, after the connection via the network interface with the external device has been established, receive, via the network interface by using the connection, the instruction data from the external device in which the application program is in active; and a function execution module configured to execute the specific function when the instruction data is received.

12. A non-transitory computer readable medium storing computer readable instructions that, when executed, cause a communication device to:

send activation information to an external device, external to the communication device, via an NFC (Near Field Communication) interface of the communication device by using a second type of Simple NFC Data Exchange Format Exchange Protocol (SNEP) connection when only the second type of SNEP connection among a first type of SNEP connection and the second type of SNEP connection is established between the communication device and the external device, the first type of SNEP connection being a connection in which the communication device operates as a SNEP server and the external device operates as a SNEP client, the second type of SNEP connection being a connection in which the communication device operates as the SNEP client and the external device operates as the SNEP server, the activation information being for causing the external device to activate an application program to be used by the external device, wherein the application program is configured to send instruction data in order to cause the communication device to execute a specific function, and when the application program is activated by the external device, a state of the external device changes from a state in which the SNEP client is invalid to a state in which the SNEP client is valid;

after the state of the external device has been changed to the state in which the SNEP client is valid, receive request data from the external device via the NFC interface by using the first type of connection when both the first type of SNEP connection and the second type of SNEP connection are established between the communication device and the external device;

in response to receiving the request data, send connection information to the external device, which has the state in which the SNEP client is valid, via the NFC interface by using the second type of SNEP connection when both the first type of SNEP connection and the second type of SNEP connection are established between the communication device and the external device, the connection information including a wireless setting to be used by the external device to participate in a wireless network;

after the connection information has been sent to the external device, establish a connection via a network interface of the communication device, different from the NFC interface, with the external device by using the connection information;

after the connection via the network interface with the external device has been established, receive, via the network interface by using the connection, the instruction data from the external device in which the application program is in active; and execute the specific function when the instruction data is received.

* * * * *